United States Patent
Jung et al.

(10) Patent No.: US 11,321,686 B2
(45) Date of Patent: May 3, 2022

(54) ELECTRONIC DEVICE AND CONTROL METHOD OF ELECTRONIC DEVICE

(71) Applicant: SAMSUNG ELECTRONICS CO., LTD., Suwon-si (KR)

(72) Inventors: Jae-ho Jung, Yongin-si (KR); Ji-hoon Park, Seoul (KR); Jin-sung Kim, Seoul (KR); Gi-won Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/623,095

(22) PCT Filed: Jun. 14, 2018

(86) PCT No.: PCT/KR2018/006694
§ 371 (c)(1),
(2) Date: Dec. 16, 2019

(87) PCT Pub. No.: WO2018/230958
PCT Pub. Date: Dec. 20, 2018

(65) Prior Publication Data
US 2020/0219071 A1    Jul. 9, 2020

(30) Foreign Application Priority Data
Jun. 14, 2017  (KR) .................... 10-2017-0075009

(51) Int. Cl.
*G06Q 20/10* (2012.01)
*G06Q 20/32* (2012.01)
(Continued)

(52) U.S. Cl.
CPC ......... *G06Q 20/102* (2013.01); *G06Q 20/322* (2013.01); *G06Q 20/3278* (2013.01);
(Continued)

(58) Field of Classification Search
None
See application file for complete search history.

(56) References Cited

U.S. PATENT DOCUMENTS 9,607,486 B2 * 3/2017 Acker, Jr. ............. G01G 19/52
10,193,700 B2   1/2019 Liu et al.
(Continued)

FOREIGN PATENT DOCUMENTS

KR    10-2007-0063897    6/2007
KR    10-2013-0138878    12/2013
(Continued)

OTHER PUBLICATIONS

Machine Translation of KR20160056749A from Espacenet (Year: 2016).*
(Continued)

*Primary Examiner* — Namrata Boveja
*Assistant Examiner* — Amit Patel
(74) *Attorney, Agent, or Firm* — Nixon & Vanderhye, P.C.

(57) ABSTRACT

An electronic device is provided. The provided electronic device includes: a display; a communication module capable of communicating with an external server; a processor configured to control the communication module and the display; and a memory electrically connected to the processor, wherein, when the electronic device is executed, the memory includes instructions for the processor to control the communication module to transmit identification information of the electronic device to the external server, control the communication module to receive, from the external server, user identification information generated by the server in response to the identification information of the electronic device, control the display to display a purchase list generated based on the user identification information,
(Continued)

and control the display to display a user interface through which payment for the purchase list is possible, based on a user input for confirming the purchase list. Other various embodiments are possible.

13 Claims, 16 Drawing Sheets

(51) Int. Cl.
  *G06Q 20/36*   (2012.01)
  *G06Q 30/06*   (2012.01)
  *G06Q 50/12*   (2012.01)

(52) U.S. Cl.
  CPC ......... *G06Q 20/36* (2013.01); *G06Q 30/0633* (2013.01); *G06Q 50/12* (2013.01)

(56) References Cited

U.S. PATENT DOCUMENTS

| | | | |
|---|---|---|---|
| 10,825,007 B2 * | 11/2020 | Fisher | ............. G06Q 30/0238 |
| 2003/0208386 A1 | 11/2003 | Brondrup | |
| 2014/0244409 A1 | 8/2014 | Nathanel et al. | |
| 2016/0132881 A1 | 5/2016 | Lee et al. | |
| 2016/0300411 A1 | 10/2016 | Isaacson | |

FOREIGN PATENT DOCUMENTS

| | | |
|---|---|---|
| KR | 10-2015-0019437 | 2/2015 |
| KR | 10-2016-0056749 | 5/2016 |
| KR | 10-2016-0105297 | 9/2016 |
| KR | 10-2017-0054917 | 5/2017 |
| WO | 2015/023713 | 2/2015 |

OTHER PUBLICATIONS

Machine Translation of KR20170054917A from Espacenet (Year: 2017).*

Machine Translation of KR20070063897A from Espacenet (Year: 2007).*

Machine Translation of KR20160105297A fro m Espacenet (Year: 2016).*

International Search Report dated Nov. 21, 2018 in counterpart International Patent Application No. PCT/KR2018/006694 and English-language translation.

Written Opinion dated Nov. 21, 2018 in counterpart International Patent Application No. PCT/KR2018/006694 and English-language translation.

Extended Search Report dated Apr. 2, 2020 in counterpart European Patent Application No. 18818462.6.

Salman, Ali, "Samsung Acquires LoopPay—Introduces NFC And Magnetic Secure Transmission Methods," WCCFtech, Feb. 20, 2015, XP055284217.

Office Action dated Mar. 6, 2021 in KR Patent Application No. 2017-0075009 and English-language translation.

Notice of Last Non-Final Rejection dated Sep. 27, 2021 in KR Application No. 10-2017-0075009 and English-language translation.

* cited by examiner (a)  (b)

ELECTRONIC DEVICE AND CONTROL METHOD OF ELECTRONIC DEVICE

This application is the U.S. national phase of International Application No. PCT/KR2018/006694 filed 14 Jun. 2018, which designated the U.S. and claims priority to KR Patent Application No. 10-2017-0075009 filed 14 Jun. 2017, the entire contents of each of which are hereby incorporated by reference.

TECHNICAL FIELD

The present disclosure relates to a control method for performing a lump sum payment for a purchase list and an electronic device for providing the same.

BACKGROUND ART

Recently, with the development of technology, electronic devices capable of performing various functions have become necessities for modern people. Such electronic devices have been being changed to multimedia communication devices by providing not only a unique voice call service but also various kinds of data transmission services and various additional services. For example, an electronic device may receive a broadcast or multicast signal and reproduce a video or a television program. In addition, the electronic device may transmit data to another electronic device by using a wired/wireless network (e.g., Bluetooth, $3^{rd}$ generation (3G), or the like).

Recently, a payment function using various methods has been loaded in electronic devices. A user may make a purchase of a product, a purchase of a service, and the like by using only an electronic device without a separate plastic card or cash.

However, when the user makes a plurality of purchases, the user may inconveniently perform payment every time a purchase occurs.

SUMMARY

As described above, according to various embodiments of the present disclosure, a user may perform a lump sum payment for a purchase list when a predetermined time elapses or a predetermined condition is satisfied, without performing a payment for every purchase.

According to various embodiments of the present disclosure, a user may preset a payment card, a payment limit, and a payment period for a specific purchase place.

DETAILED DESCRIPTION OF EXAMPLE EMBODIMENT

Figure 1A:
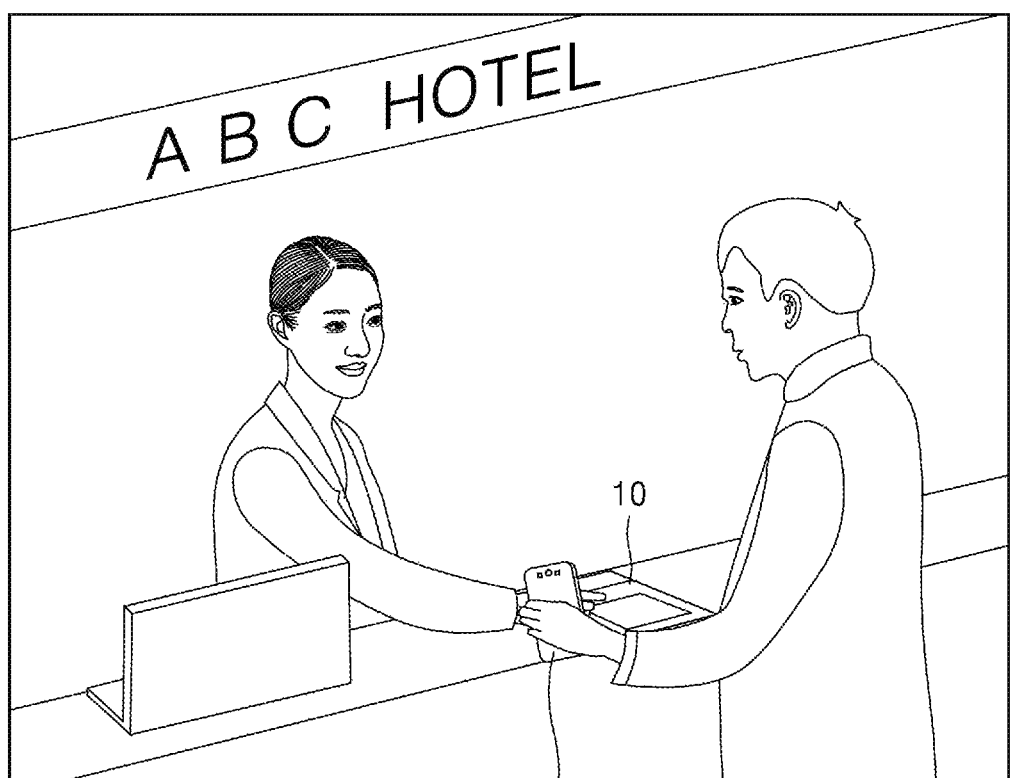
FIG. 1A illustrates a situation in which information about an electronic device is shared with an external server by using the electronic device, according to an embodiment.

According to an embodiment, an electronic device includes: a display; a communication module capable of communicating with an external server; a processor configured to control the communication module and the display; and a memory electrically connected to the processor, wherein, when the electronic device is executed, the memory includes instructions for the processor to control the communication module to transmit identification information of the electronic device to the external server, control the communication module to receive, from the external server, user identification information generated by the server in response to the identification information of the electronic device, control the display to display a purchase list generated based on the user identification information, and control the display to display a user interface through which a payment for the purchase list is possible, based on a user input for confirming the purchase list.

According to an embodiment, a method of controlling an electronic device includes: transmitting electronic device identification information to an external server; receiving and storing user identification information generated by the server in response to the electronic device identification information; receiving a purchase list generated based on the user identification information and displaying the purchase list on a display; and displaying a user interface through which a payment for the purchase list is possible, based on a user input for confirming the purchase list.

MODE OF DISCLOSURE

Hereinafter, various embodiments of the present disclosure will be described with reference to the accompanying drawings. It should be understood that the embodiments and the terms used therein do not have any intention to limit the technology disclosed in the present disclosure to a specific implementation form but include various modifications, equivalents, and/or alternatives of corresponding embodiments. In the description of the drawings, like reference numbers are used to refer to like elements. An expression in the singular may include an expression in the plural unless they are clearly different from each other in context. In the present disclosure, the expression such as "A or B" or "at least one of A and/or B" may include all possible combinations of items listed together. The expressions such as "first" and "second" may be used to describe corresponding elements regardless of order or importance and are used to classify a certain element from another element, and the elements are not limited by the expressions. When it is described that a certain element (e.g., a first element) is "(operatively or communicatively) coupled with/to" or "connected to" another element, the certain element may be connected to another element directly or via another element (e.g., a third element) in the middle.

The expression "configured to" used in the present disclosure may be interchangeably used with, for example, "suitable for", "having the capacity to", "changed to", "made to", "capable of", or "designed to" in a hardware or software manner in accordance with circumstances. In a certain circumstance, the expression "a device configured to" may indicate that the device "capable of" with another device or parts. For example, the wording "a processor configured to perform A, B, and C" may indicate an exclusive processor (e.g., an embedded processor) for performing a corresponding operation or a generic-purpose processor (e.g., a central processing unit (CPU) or an application processor) capable of performing corresponding operations by executing one or more software programs stored in a memory device.

An electronic device, according to various embodiments of the present disclosure, may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, medical equipment, a camera, or a wearable device. The wearable device may include at least one of an accessory-type device (e.g., a watch, a ring, a bracelet, an anklet, a necklace, glasses, a contact lens, or a head-mounted-device (HMD)), a fabric or cloth integrated-type device (e.g., electronic cloths), a body attachment-type device (e.g., a skin pad or a tattoo), or a bioimplant-type circuit. According to some embodiments, the electronic device may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ PlayStation™), an electronic dictionary, an electronic key, a camcorder, or an electronic frame.

According to other embodiments, the electronic device may include at least one of various types of medical equipment (e.g., various portable medical measuring instruments (a glucometer, a cardiotachometer, a sphygmomanometer, a thermometer, or the like), a magnetic resonance angiography (MRA), magnetic resonance imaging (MRI), or computed tomography (CT) machine, an ultrasonic machine, or the like), a navigation machine, a satellite navigation system (a global navigation satellite system (GNSS)), an event data recorder (EDR), a flight data recorder (FDR), a vehicle infotainment device, vessel electronic equipment (e.g., a vessel navigation machine, a gyrocompass, or the like), avionics, a security device, a vehicle head unit, an industrial or home robot, a drone, an automatic teller's machine (ATM) of a financial institution, a point of sales (POS) of a shop, or an Internet of Things (IoT) device (e.g., a light bulb, various kinds of sensors, a sprinkler device, a fire alarm, a thermostat, a streetlight, a toaster, fitness equipment, a geyser, a heater, a boiler, or the like). According to some embodiments, the electronic device may include at least one of a part of furniture, a building/structure or a vehicle, an electronic board, an electronic signature receiving device, a projector, or various types of measuring devices (e.g., a water, electricity, gas, or electronic wave measuring device). According to various embodiments, the electronic device may be flexible or may include the various devices described above, taken alone or in combination. The electronic device, according to an embodiment of the present disclosure is not limited to the devices described above.

According to various embodiments of the present disclosure, the electronic device may include the various devices described above, taken alone or in combination. In addition, according to various embodiments of the present disclosure, the electronic device may be a flexible device.

According to various embodiments of the present disclosure, when the electronic device generates a magnetic field signal, the same current as a magnetic card swipes a card read device at a position of a header may be generated by the card read device. That is, a user may pay an expense or the like by allowing a portable device to be in the proximity of the card read device or to come in contact with the card read device.

Magnetic field communication schemes may include near field communication (NFC), magnetic secure transmission or near field magnetic data stripe transmission (MST), and the like. These schemes may have different data rates (bits/sec), communication ranges, and frequencies. In addition, NFC is a bidirectional communication scheme, whereas MST is a unidirectional communication scheme (e.g., transmitting from one side without ping).

In the present disclosure, the term "user" may indicate a person using the electronic device or a device (e.g., an artificial intelligence electronic device) using the electronic device.

FIG. 1A illustrates a situation in which information about an electronic device is shared with an external server by using the electronic device, according to an embodiment.

For example, a user may transmit identification information of the user to a desired server to generally manage behaviors of the user, which are accumulated in a specific server.

Referring to FIG. 1A, the user may perform a preparation operation for communicating information of an electronic device 100 with a server (not shown) in a hotel. For example, the user may start information sharing with the server through an input and output device 10 electrically connected to the server in the hotel in order to start the information sharing with the server in the hotel.

Particularly, wireless communication may be established between the electronic device 100 and the input and output device 10. The wireless communication may include, for example, cellular communication using at least one of long-term evolution (LTE), LTE Advance (LTE-A), code division multiple access (CDMA), wideband CDMA (WCDMA), universal mobile telecommunications system (UTMS), Wireless Broadband (WiBro), or Global System for Mobile Communications (GSM).

According to an embodiment, the wireless communication may include, for example, at least one of wireless fidelity (Wi-Fi), Bluetooth, Bluetooth low energy (BLE), Zigbee, NFC, MST, radio frequency (RF), or body area network (BAN).

According to an embodiment, when the electronic device 100 comes in contact with or approaches the input and output device 10, communication may be established between the electronic device 100 and the input and output device 10. For example, when the user checks in the hotel, the user may establish communication with the server in the hotel by making the user's owned electronic device 100 approach the input and output device 10.

Figure 1B:
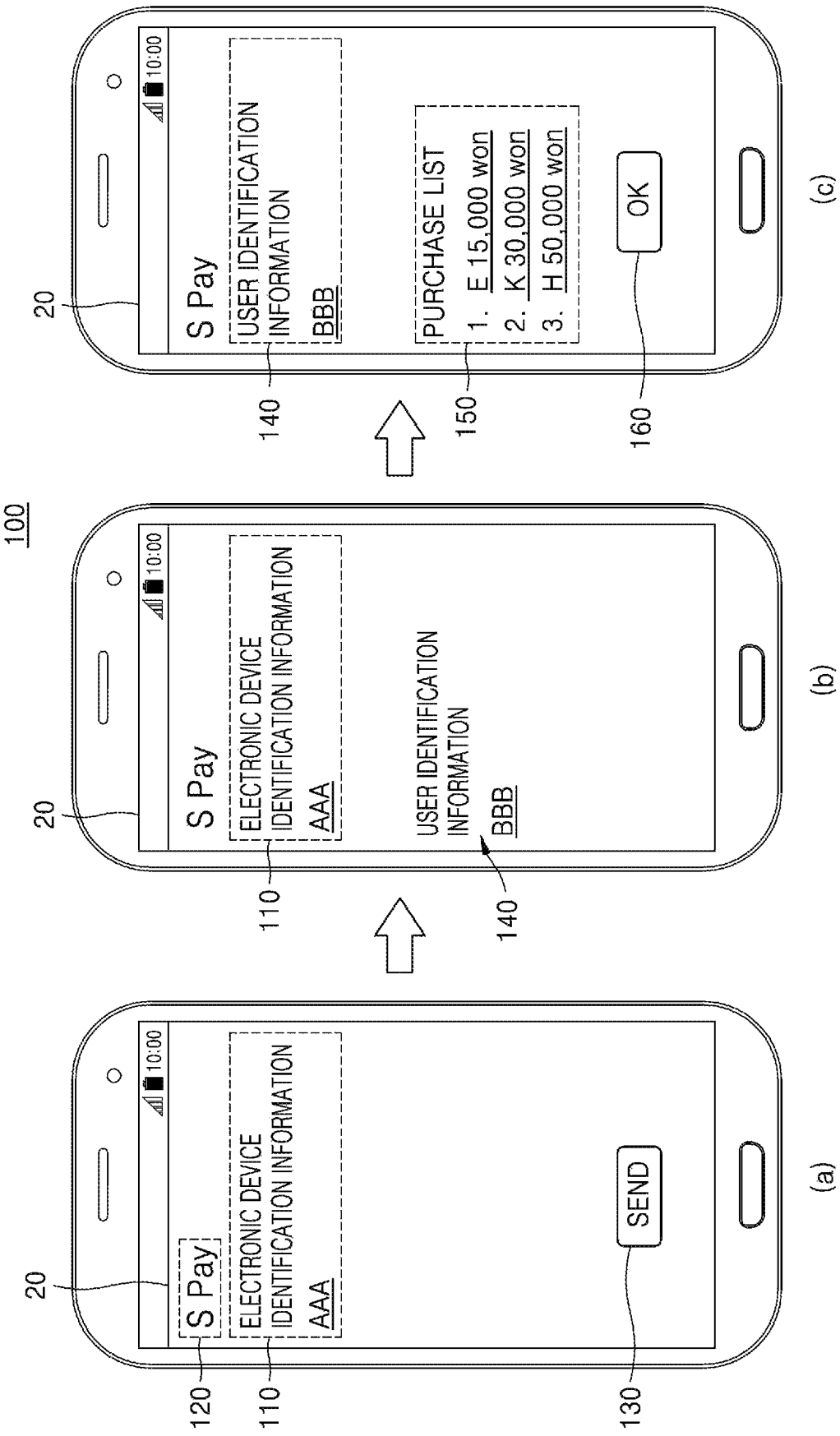
FIG. 1B sequentially illustrates an information exchange operation between an electronic device and a server, according to an embodiment.

FIG. 1B sequentially illustrates an information exchange operation between an electronic device and a server, according to an embodiment.

Referring to reference number a1 of FIG. 1B, the electronic device 100 which has established communication with a server in a hotel may display, on a display 20, a user interface for requesting confirmation to transmit electronic device identification information 110 to the server in the hotel.

According to an embodiment, the electronic device 100 may execute an application capable of exchanging information with the server in the hotel and the like and then display, on the display 20, a user interface for requesting confirmation to transmit the identification information 110 to the server in the hotel.

The application capable of exchanging information with the server in the hotel and the like may include, for example, an application capable of performing a payment. An application 120 capable of performing a payment may include, for example, a Samsung Pay™ application. The application 120 may provide, for example, a user interface related to payment. The application 120 may include a wallet user interface (UI/user experience (UX)). For example, the application 120 may provide a user interface related to card registration, payment, or transaction.

The electronic device identification information 110 transmitted from the electronic device 100 may include, for example, a number corresponding to the electronic device 100 or an electronic device identification (ID). The number corresponding to the electronic device 100 may include a telephone number matched with the electronic device 100. The electronic device ID may include a serial number of the electronic device 100.

According to an embodiment, the electronic device 100 may transmit the identification information 110 to the server in the hotel in response to a user input for touching a "send" object 130.

Referring to reference number b1 of FIG. 1B, the electronic device 100 may receive information corresponding to electronic device identification information from the server.

For example, the electronic device 100 may receive user identification information 140 corresponding to the electronic device identification information 110 transmitted to the server.

According to an embodiment, the user identification information 140 may be generated by the server in the hotel by being matched with the electronic device identification information 110. For example, the server in the hotel may generate the user identification information 140 by using a room number which the user checks in.

Referring to reference number b1 of FIG. 1B, the electronic device 100 may display, on the display 20, the user identification information 140 transmitted from the server in the hotel together with the electronic device identification information 110.

According to an embodiment, the user may perform various purchase behaviors in the hotel by using the user identification information 140. For example, when the user has a meal in a restaurant included in the hotel or buy a product in a shop included in the hotel, a clerk may sort a purchase list by being matched with the user identification information 140. For example, the clerk may sort a current purchase breakdown, i.e., a purchase list, of the user by using an input device (e.g., a computer, a tablet PC, a smartphone, or the like) which establishes a network with the server in the hotel. In this case, the user may have a meal or purchase a product without performing a payment therefor.

Referring to reference number c1 of FIG. 1B, the server in the hotel may transmit a purchase list to the electronic device 100 of the user when it is a preset time or when the user requests the purchase list. The electronic device 100 may display, on the display 20, a user interface including a purchase list 150 of the user together with the user identification information 140.

According to an embodiment, the electronic device 100 may confirm the purchase list 150 in response to a user input for touching an "OK" object 160. The electronic device 100 which has confirmed the purchase list 150 may transmit the user's confirmation on the purchase list 150 to the server in the hotel by being linked to the server in the hotel.

In addition, according to an embodiment, upon confirming the purchase list 150, the electronic device 100 may display a user interface for performing a payment for the purchase list 150 by using an application capable of performing a payment.

As described above, a user may perform a lump sum payment for a purchase list after a preset time or if necessary without performing a payment every time a purchase occurs, by using user information generated by an external server in response to electronic device identification information.

Figure 2:
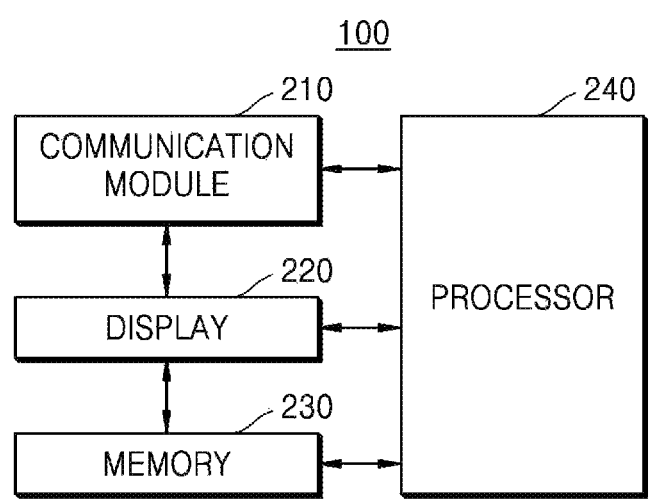
FIG. 2 is a schematic block diagram of an electronic device according to an embodiment.

FIG. 2 is a schematic block diagram of an electronic device according to an embodiment.

Referring to FIG. 2, the electronic device 100 may include a communication module 210, a display 220, a processor 240, and a memory 230. However, the electronic device 100 is not limited thereto.

The communication module 210 may include, for example, a cellular module, a Wi-Fi module, a Bluetooth module, an RF module, and the like. The communication module 210 may form a network with another external electronic device, such as a server, under control of the processor 240.

According to an embodiment, the communication module 210 may transmit electronic device identification information to an external server under control of the processor 240. In addition, the communication module 210 may receive, from the external server, user identification information generated in response to the electronic device identification information.

In addition, the communication module 210 may receive, from the server, a purchase list generated based on the user identification information.

The processor 240 may control a plurality of hardware components or software components connected to the processor 240 by driving, for example, an operating system or an application program and may perform various kinds of data processing and calculations.

According to an embodiment, the processor 240 may transmit the electronic device identification information to the external server through the communication module 210. In addition, the processor 240 may receive the user identification information from the external server through the communication module 210.

According to an embodiment, the processor 240 may perform a control such that a purchase list generated by the server based on the user identification information is received through the communication module 210 and displayed on the display 220.

The display 220 may include, for example, a liquid crystal display (LCD), a light emitting diode (LED) display, an organic LED (OLED) display, a microelectromechanical systems (MEMS) display, or an electronic paper display. The display 220 may include a touch screen and may receive a touch, gesture, proximity, or hovering input using, for example, an electronic pen or a part of the user's body.

According to an embodiment, the display 220 may display a user interface for transmitting the electronic device identification information under control of the processor 240. In addition, the display 220 may display a user interface including the received user identification information and a purchase list generated in correspondence to the user identification information.

The memory 230 may include, for example, an internal memory or an external memory. The internal memory may include at least one of, for example, a volatile memory (e.g., dynamic random access memory (DRAM), static RAM (SRAM), synchronous DRAM (SDRAM), or the like) or a non-volatile memory (e.g., one time programmable read-only memory (OTPROM), programmable ROM (PROM), erasable and programmable ROM (EPROM), electrically erasable and programmable ROM (EEPROM), mask ROM, flash ROM, a flash memory, a hard drive, or a solid state drive (SSD)). The external memory may include a flash drive, for example, a compact flash (CF) card, a secure digital (SD) card, a micro secure digital (Micro-SD) card, a mini secure digital (Mini-SD) card, an extreme digital (xD) card, a multi-media card (MMC), a memory stick, or the like. The external memory may be functionally or physically connected to the electronic device 100 through various interfaces.

According to various embodiments, the server may also include a processor, a communication module, and a memory. The communication module included in the server may form a network with the electronic device 100 under control of the processor included in the server. The communication module included in the server may receive the electronic device identification information under control of the processor included in the server and transmit, to the electronic device 100, the user identification information generated in response to the electronic device identification information.

The processor included in the server may control a plurality of hardware components or software components connected to the processor included in the server by driving, for example, an operating system or an application program and may perform various kinds of data processing and calculations. The processor included in the server may generate the user identification information based on the received electronic device identification information.

The memory included in the server may include, for example, an internal memory and an external memory. The memory included in the server may store the received electronic device identification information, the generated user identification information, a purchase list generated based on the user identification information, and the like.

Figure 3:
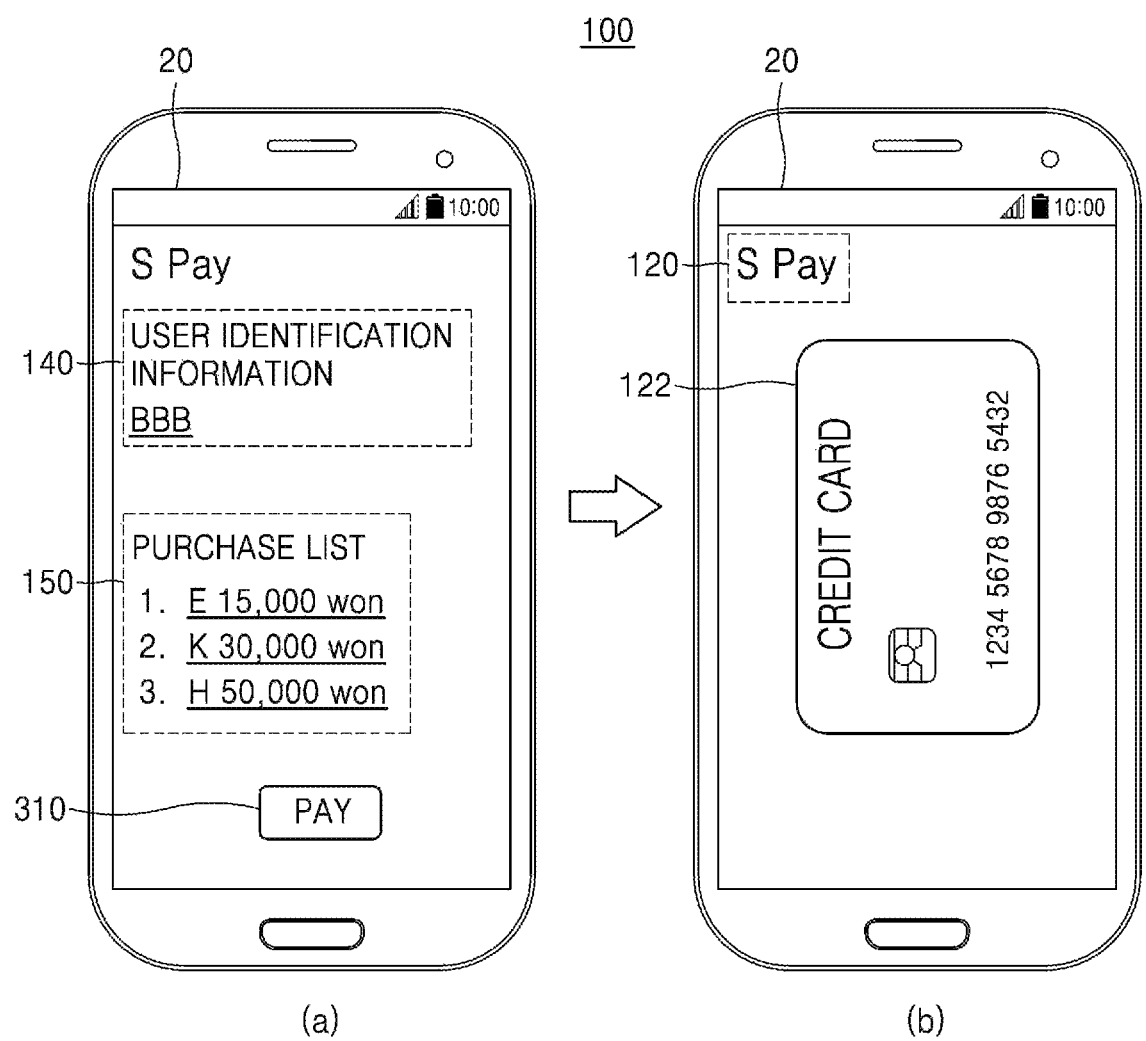
FIG. 3 illustrates a situation in which an electronic device performs a lump sum payment for a purchase list, according to an embodiment.

FIG. 3 illustrates a situation in which an electronic device performs a lump sum payment for a purchase list, according to an embodiment.

Referring to reference number a3 of FIG. 3, a server in a hotel may transmit the purchase list 150 to the electronic device 100 of the user when it is a preset time or when the user requests the purchase list 150. The electronic device 100 may display, on the display 20, a user interface including the user's purchase list 150 together with the user identification information 140.

According to an embodiment, the electronic device 100 may display an object (e.g., "pay" 310) for a payment progress when the user's confirmation on the purchase list 150 is input. When the user selects "pay" 310, the electronic device 100 may display a user interface for performing a payment for the purchase list 150 by using an application capable of performing a payment.

Reference number b3 of FIG. 3 is for an electronic device to perform a payment for a purchase list by using a payment application, according to an embodiment.

Referring to reference number b3 of FIG. 3, the electronic device 100 may execute a payment application 120 and display a user interface of the payment application 120 on the display 20. The user interface of the payment application 120 may display a payment card 122 with which a payment is to be performed. However, the present embodiment is not limited thereto.

The electronic device 100 may perform a payment by using the NFC or MST scheme described above. In this case, the electronic device 100 may request biometric authentication (e.g., fingerprint authentication, iris authentication, or the like) or a password for user authentication.

The electronic device 100 which has completed a user authentication procedure may transmit payment information to a POS device through an NFC module. For example, when an NFC signal is received from the POS device, the electronic device 100 may transmit payment information to the POS device. In addition, according to various embodiments, the electronic device 100 may transmit payment information to the POS device by using an MST module.

The POS device may be a terminal capable of receiving a magnetic signal and performing short range communication. For example, the POS device may be an electronic cash register, a patrol reader, a credit card automatic identification device, or the like.

According to an embodiment, the POS device may transmit, to a payment server, the payment information received from the electronic device 100 According to an embodiment, the payment server may perform an authentication on information received from the POS device. According to various embodiments, the payment server may request the authentication on the payment information from another payment server, a financial server, or the like.

According to an embodiment, the payment server may transmit an authentication result of the payment information to the POS device. Base on the authentication result, the POS device may output a transaction completion receipt or transmit related data such that a transaction failure message is displayed on the display 20 of the electronic device 100.

According to various embodiments, even though the user does not operate the electronic device 100 at a counter, a payment may be performed.

For example, the user may install, in the electronic device 100, an application configured to perform a payment by a voice of the user and register the face of the user or the like.

When the user stands in front of the counter with the electronic device 100 and indicates a payment intension by a voice, a casher may check pre-registered information of the user and perform a payment. In this case, the electronic device 100 may perform a payment only when Wi-Fi, Bluetooth, and a position recognition service of the electronic device 100 are activated.

Figure 4:
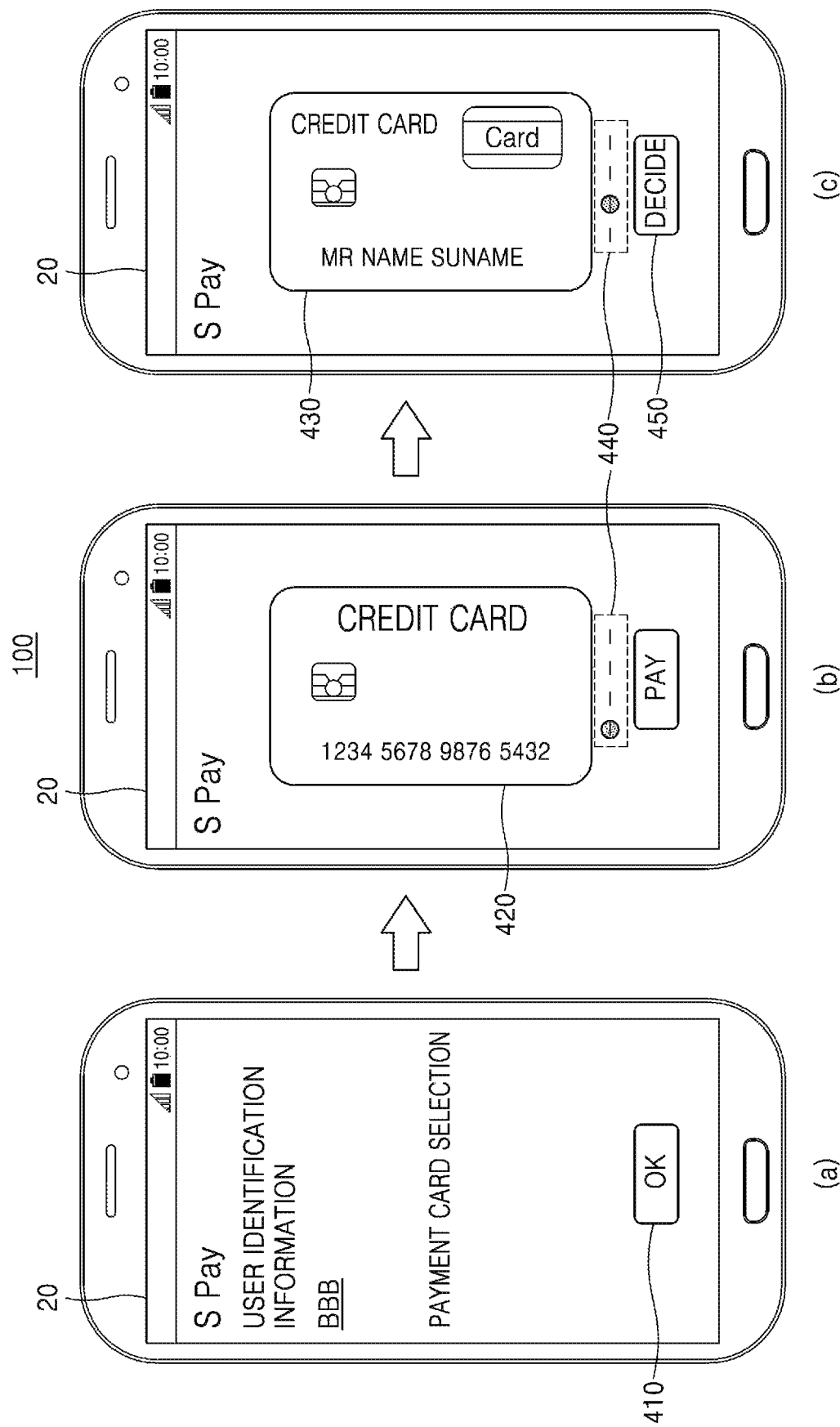
FIG. 4 illustrates a situation in which a card to be used is selected when a lump sum payment for a purchase list is performed on an electronic device, according to an embodiment.

FIG. 4 illustrates a situation in which a card to be used is selected when a lump sum payment for a purchase list is performed on an electronic device, according to an embodiment.

According to an embodiment, when the electronic device 100 receives user identification information from a server in a hotel, a payment application may store the received user identification information. Therefore, the payment application may discriminate a general payment from a payment for a purchase list generated in response to the user identification information.

Referring to reference number a4 of FIG. 4, the electronic device 100 may display, on the display 20, a user interface for selecting a payment card. For example, the electronic device 100 may execute a payment application and display a user interface for selecting a payment card with which a purchase list corresponding to user identification information is paid.

Referring to reference numbers a4 and b4 of FIG. 4, the electronic device 100 according to an embodiment may display, on the display 20, a card 420 with which a payment is possible or an account list in response to a user input for selecting "OK" 410.

For example, the electronic device 100 may display one payment card 420 on the display 20. However, the present embodiment is not limited thereto. For example, the electronic device 100 may display all selectable payment cards or payment accounts on the display 20.

Referring to reference number c4 of FIG. 4, the electronic device 100 may display another payment card 430 or an account list in response to, for example, a user input of touch and drag to the left and the right on the display 20. According to an embodiment, the electronic device 100 may display an indicator 440 in response to a change in a payment card or account displayed on the display 20. Therefore, the user may easily find out a desired payment card or payment account while checking the indicator 440.

According to an embodiment, the electronic device 100 may determine the payment card 430 displayed on the display 20 as a card with which a lump sum payment for a purchase list generated in response to the user identification information is to be performed, in response to a user input signal for selecting "decide" 450.

However, the present embodiment is not limited thereto. For example, when the electronic device 100 displays all selectable payment cards or accounts on the display, the electronic device 100 may determine a card or account with which a lump sum payment for a purchase list is to be performed, in response to a user input for selecting one of the displayed cards or accounts.

Figure 5:
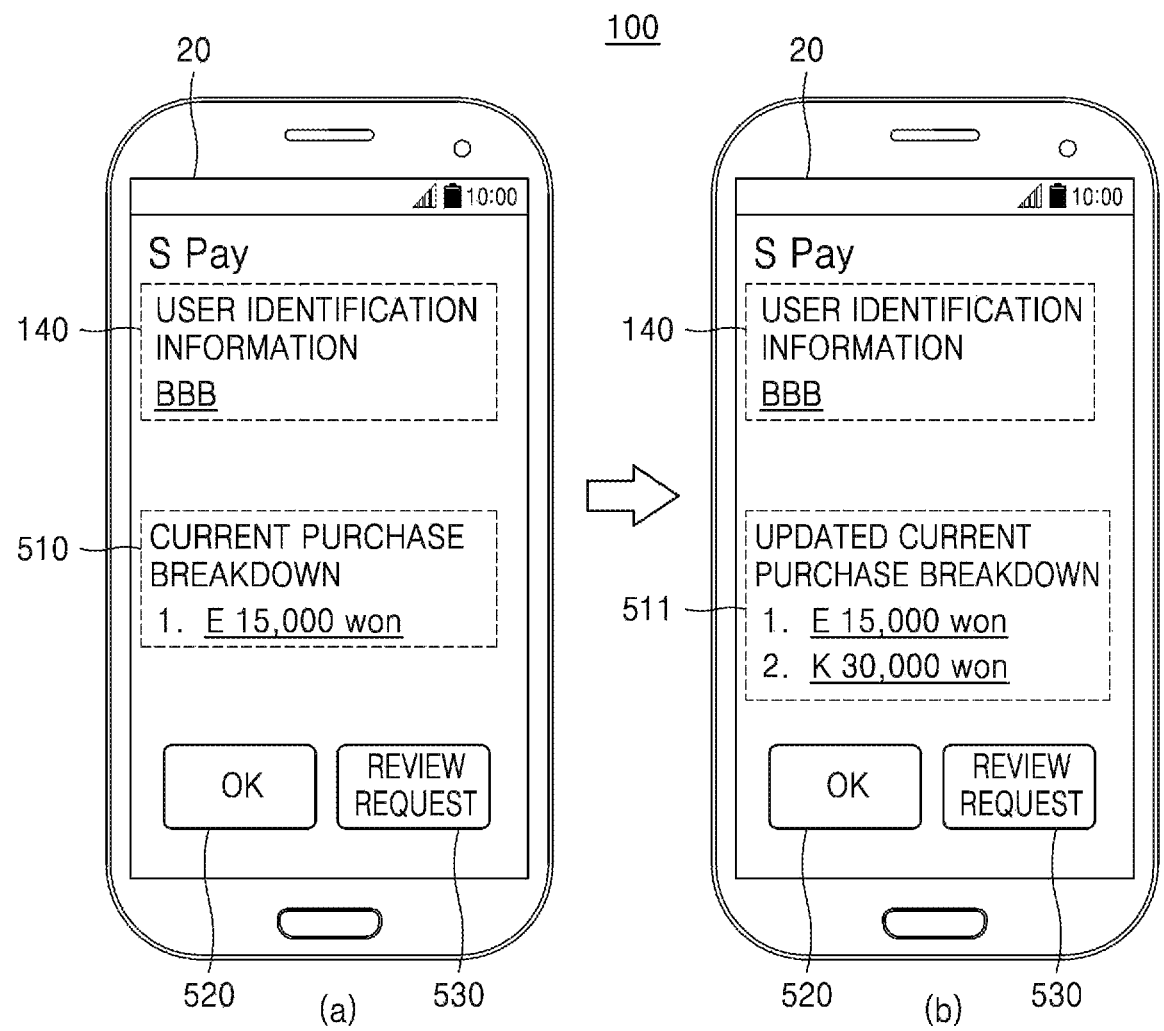
FIG. 5 illustrates a situation in which an electronic device receives and displays a current purchase breakdown, according to an embodiment.

FIG. 5 illustrates a situation in which an electronic device receives and displays a current purchase breakdown, according to an embodiment.

According to an embodiment, when a purchase behavior using user identification information registered in a server occurs, the server may transmit a current purchase breakdown to the electronic device 100 corresponding to the user identification information at the same time as the occurrence of the purchase behavior or sequentially.

Referring to reference number a5 of FIG. 5, the electronic device 100 may display, on the display 20, a user interface including the user identification information 140 and a current purchase breakdown 510. The user interface including the user identification information 140 and the current purchase breakdown 510 may display an object (e.g., OK 520) for requesting the user's confirmation on the current purchase breakdown and may also display an object (e.g., review request 530) for requesting re-confirmation on the current purchase breakdown.

That is, when the current purchase breakdown 510 displayed on the electronic device 100 matches a purchase behavior memorized by the user, the user may select "OK" 520. The electronic device 100 which has confirmed the current purchase breakdown 510 may transmit, to the server, a signal according to the user's confirmation on the current purchase breakdown 510 by being linked to the server in a hotel.

Alternatively, when the current purchase breakdown 510 displayed on the electronic device 100 does not match a purchase behavior memorized by the user, the user may select "review request" 530. The electronic device 100 which has received a user input for the review request for the current purchase breakdown 510 may transmit, to the server, the contents of the user's review request for the current purchase breakdown 510 by being linked to the server in the hotel.

Referring to reference number b5 of FIG. 5, when an additional purchase behavior using the user identification information registered in the server occurs, the server may transmit a current purchase breakdown to the electronic device 100 corresponding to the user identification information at the same time as the occurrence of the purchase behavior or sequentially.

According to an embodiment, the electronic device 100 may display, on the display 20, a user interface including the user identification information 140 and an updated current purchase breakdown 511 including the additional purchase behavior. The user interface including the user identification information 140 and the updated current purchase breakdown 511 may display an object (e.g., OK 520) for requesting the user's confirmation on the current purchase breakdown 511 and may also display an object (e.g., review request 530) for requesting re-confirmation on the current purchase breakdown.

The user may select "OK" 520 or "review request" 530 as described above to confirm a purchase to the server or to request a review of the purchase from the server.

Figure 6:
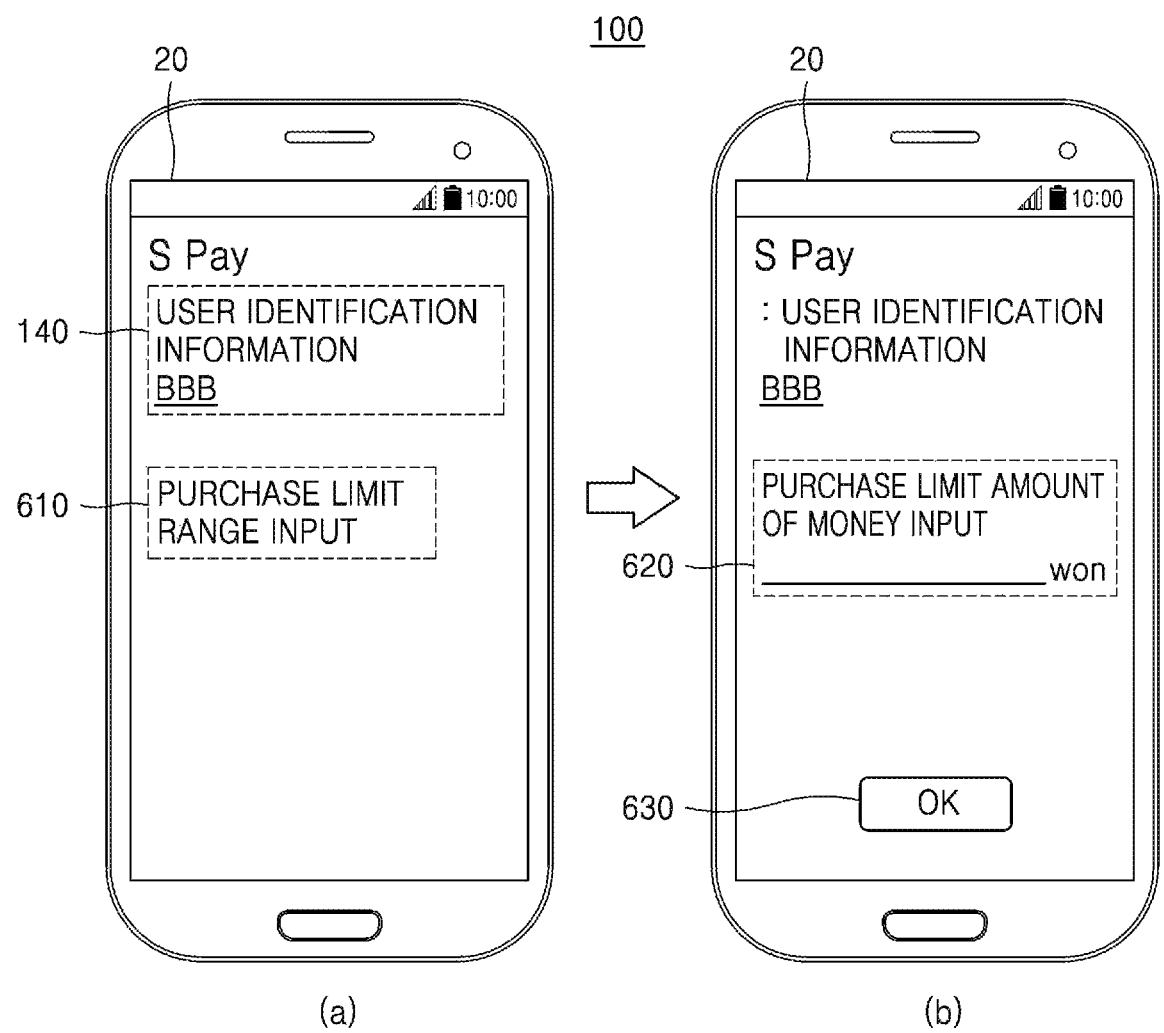
FIG. 6 illustrates a situation of inputting a purchase limit range on an electronic device, according to an embodiment.

FIG. 6 illustrates a situation of inputting a purchase limit range on an electronic device, according to an embodiment.

According to an embodiment, when the electronic device 100 receives user identification information from a server in a hotel, a payment application may store the received user identification information. Therefore, the payment application may discriminate a general payment from a payment for a purchase list generated in response to the user identification information.

In this case, unlike the general payment, it may be configured that a limit range is determined for a purchase generated in correspondence to the user identification information, and the purchase is possible within the limit range.

Referring to reference number a6 of FIG. 6, the electronic device 100 according to an embodiment may display, on the display 20, a user interface for inputting a purchase limit range which can be generated in correspondence to the user identification information 140.

The user interface may display the user identification information 140 and a purchase limit range input execution object 610.

Referring to reference number b6 of FIG. 6, the electronic device 100 may display an object 620 through which a purchase limit amount of money can be input and an object 630 for confirming the input amount of money, in response to a user input for selecting the purchase limit range input execution object 610.

According to an embodiment, the electronic device 100 may display an object (not shown), through which a number can be input, on the display 20 in a pop-up form in response to a user input for selecting the object 620 through which a purchase limit amount of money can be input However, a method of inputting a number on the electronic device 100 is not limited thereto.

A user may input a purchase limit range by selecting a number displayed on the display 20 and then select an object (e.g., OK 630) for confirming an input amount of money, thereby deciding the input amount of money.

The electronic device 100 which has confirmed the amount of money of the purchase limit range may transmit the amount of money of the purchase limit range to the server in the hotel by being linked to the server in the hotel.

As described above, the electronic device 100 according to an embodiment may easily purchase a desired product or service by using preset user identification information and furthermore preset a purchase limit range based on the user identification information.

Figure 7:
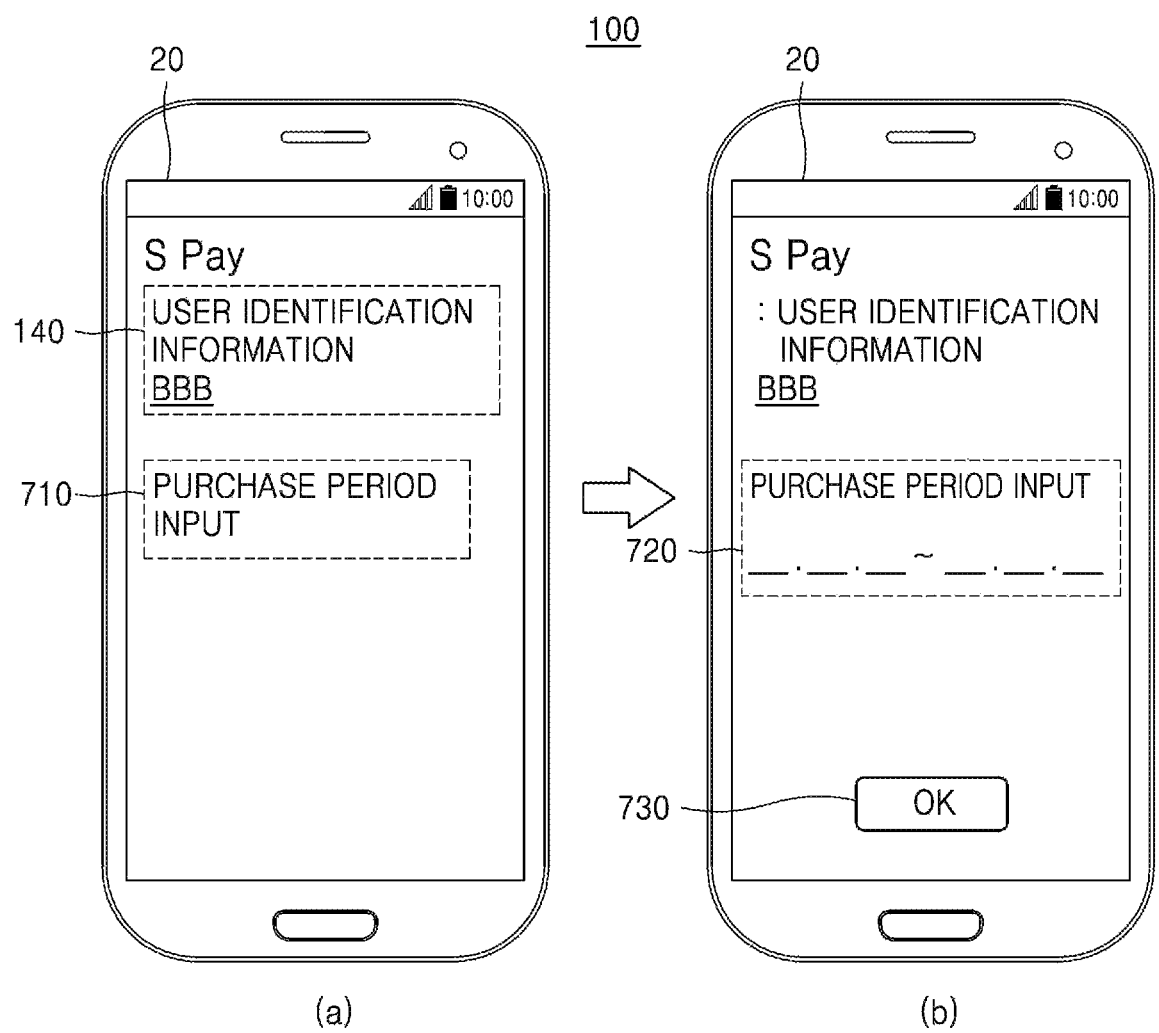
FIG. 7 illustrates a situation of inputting a purchase enable period on an electronic device, according to an embodiment.

FIG. 7 illustrates a situation of inputting a purchase enable period on an electronic device, according to an embodiment.

According to an embodiment, when the electronic device 100 receives user identification information from a server in a hotel, a payment application may store the received user identification information. Therefore, the payment application may discriminate a general payment from a payment for a purchase list generated in response to the user identification information.

In this case, unlike the general payment, a user may set a purchase enable period for a purchase generated in correspondence to the user identification information, perform a purchase within the set period, and perform a payment.

Referring to reference number a7 of FIG. 7, the electronic device 100 according to an embodiment may display, on the display 20, a user interface for inputting a purchase enable period which can be generated in correspondence to the user identification information 140.

The user interface may display the user identification information 140 and a purchase enable period input execution object 710.

Referring to reference number b7 of FIG. 7, the electronic device 100 may display an object 720 through which a purchase enable period can be input and an object 730 for confirming the input period, in response to a user input for selecting the purchase enable period input execution object 710.

According to an embodiment, the electronic device 100 may display a virtual keypad (not shown), through which a number can be input, on the display 20 in a pop-up form in response to a user input for selecting the object 720 through which a purchase enable period can be input. However, a method of inputting a number on the electronic device 100 is not limited thereto.

A user may input a purchase enable period by selecting a number displayed on the display 20 and then select an object (e.g., OK 730) for confirming the input period, thereby deciding the input period.

The electronic device 100 which has confirmed the purchase enable period may transmit the purchase enable period to the server in the hotel by being linked to the server in the hotel.

As described above, the electronic device 100 according to an embodiment may easily purchase a desired product or service by using preset user identification information and furthermore preset a purchase enable period based on the user identification information.

Figure 8:
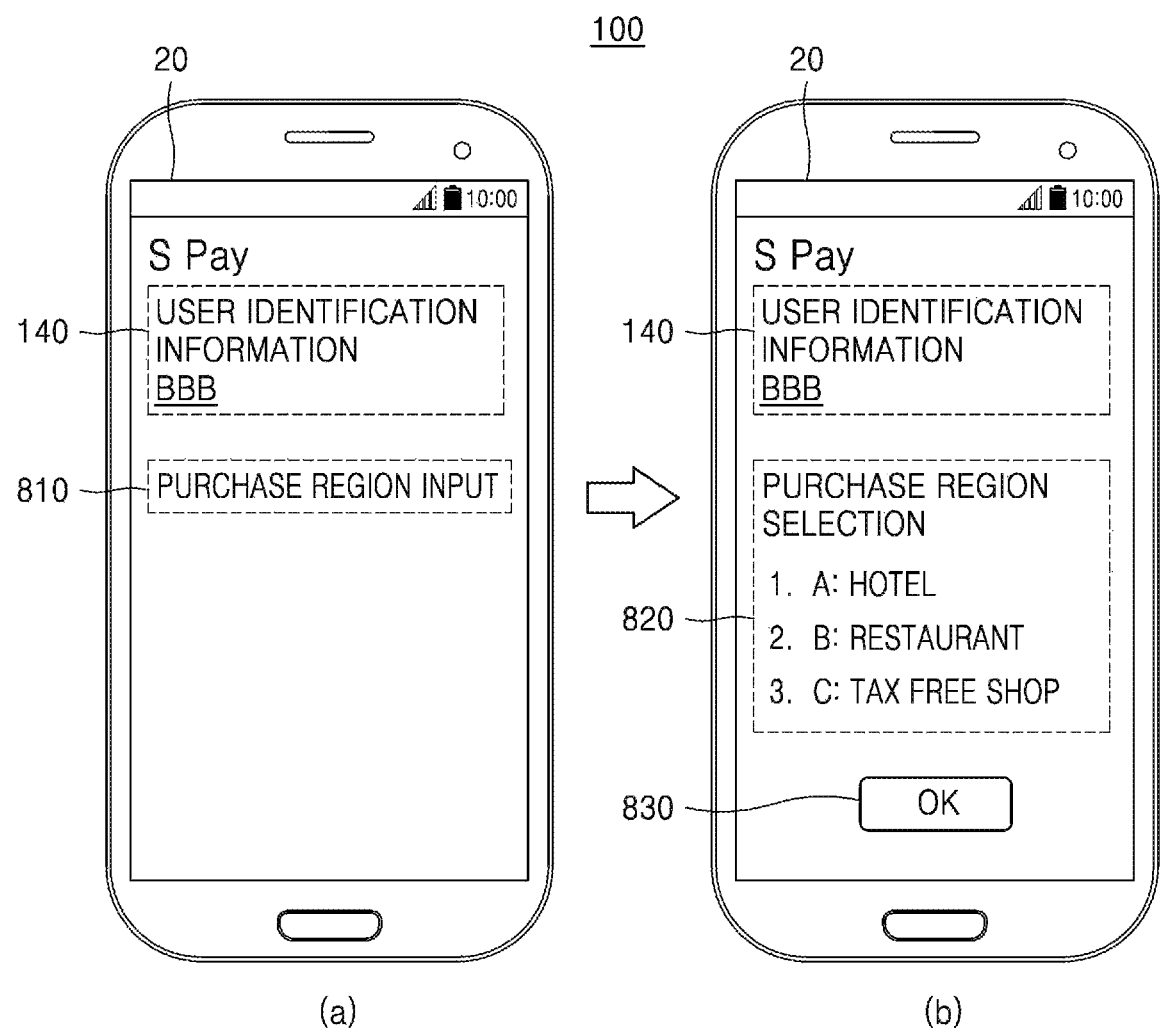
FIG. 8 illustrates a situation of inputting a purchase enable period on an electronic device, according to an embodiment.

FIG. 8 illustrates a situation of inputting a purchase enable period on an electronic device, according to an embodiment.

According to an embodiment, when the electronic device 100 receives user identification information from a server in a hotel, a payment application may store the received user identification information. Therefore, the payment application may discriminate a general payment from a payment for a purchase list generated in response to the user identification information.

In this case, unlike the general payment, a user may set a purchase enable region for a purchase generated in correspondence to the user identification information, perform a purchase in the set region, and perform a payment.

The purchase enable region may include, for example, a region a shop, or the like in which a purchase list can be managed by being linked to the server in the hotel.

Referring to reference number a8 of FIG. 8, the electronic device 100 according to an embodiment may display, on the display 20, a user interface for inputting a purchase enable region which can be generated in correspondence to the user identification information 140.

The user interface may display the user identification information 140 and a purchase enable region input execution object 810.

Referring to reference number b8 of FIG. 8, the electronic device 100 may display an object 820 through which a purchase enable region can be selected and an object 830 for confirming the input region, in response to a user input for selecting the purchase enable region input execution object 810.

According to an embodiment, the electronic device 100 may discriminatively display, from the other items, a region or a shop selected in response to a user input for selecting one item in a list included in the object 820 through which a purchase enable region can be input.

For example, the electronic device 100 may mark the selected item with a different color or a different brightness value. However, a method of discriminating a selected item from non-selected items is not limited thereto.

A user may input a purchase enable region by selecting the marked item and then select an object (e.g., OK 830) for confirming the input region, thereby deciding the input region.

The electronic device 100 which has confirmed the purchase enable region may transmit the purchase enable region to the server in the hotel by being linked to the server in the hotel.

As described above, the electronic device 100 according to an embodiment may easily purchase a desired product or service by using preset user identification information and furthermore preset a purchase enable region or shop based on the user identification information.

Figure 9:
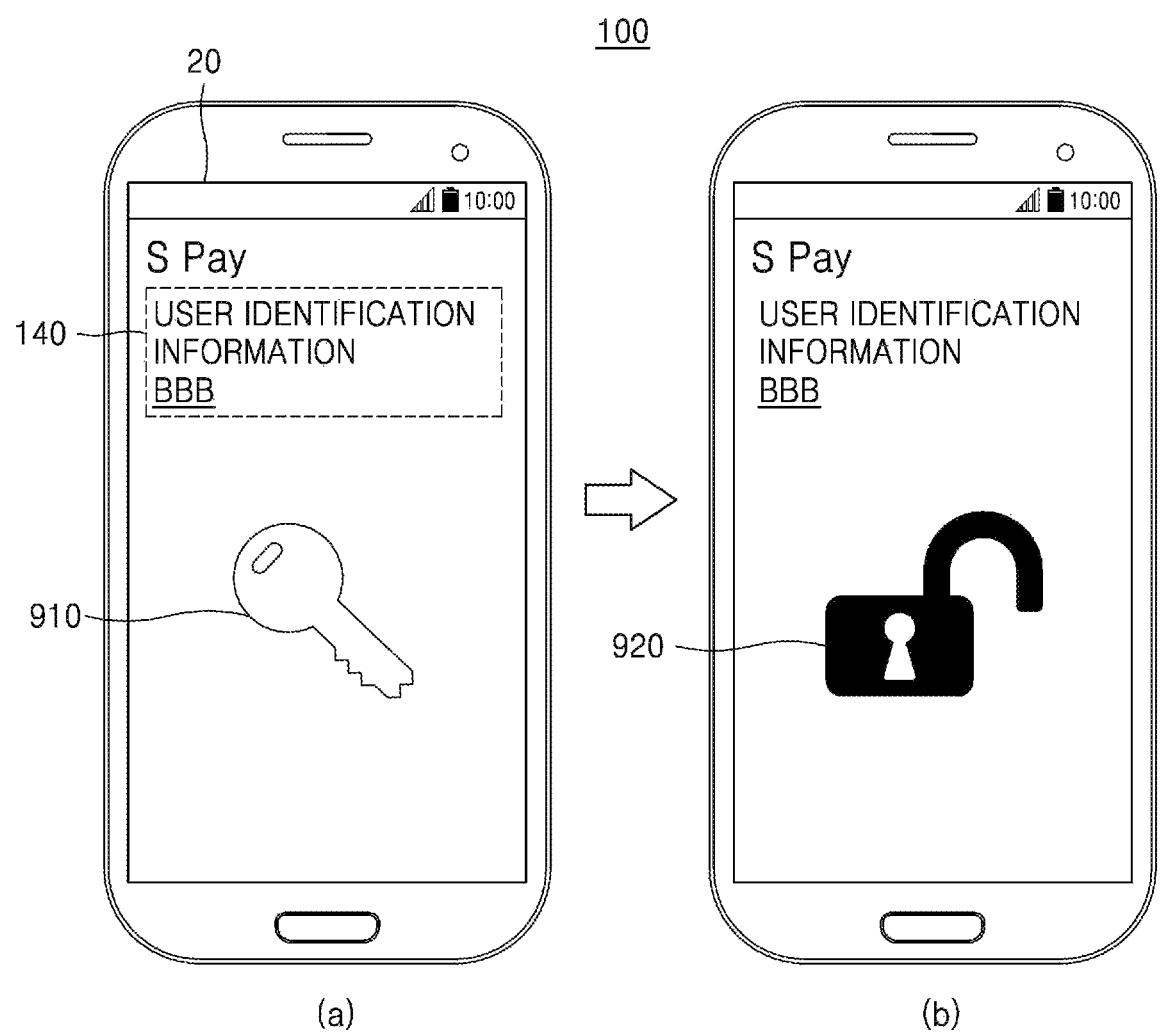
FIG. 9 illustrates a situation in which an electronic device locks or unlocks a door by using user identification information, according to an embodiment.

FIG. 9 illustrates a situation in which an electronic device locks or unlocks a door by using user identification information, according to an embodiment.

For example, when the electronic device 100 receives user identification information by being linked to a server in a hotel, the electronic device 100 may use the user identification information even in a case where a door of a room in the hotel is locked or unlocked.

Referring to reference number a9 of FIG. 9, when a user allows the electronic device 100 to come in contact with or approach a door device in the front of a room, the door device may transmit, to the electronic device 100, a signal for requesting the user identification information 140.

For example, when the door device includes an NFC module, NFC tag information for requesting user identification information included in the door device may be transmitted to the electronic device 100 through the NFC module or the like.

According to an embodiment, an NFC tag signal generated by the door device may include different information from that included in an NFC tag signal generated by a POS device. For example, the door device may transmit, to the electronic device 100, an NFC tag signal for requesting user identification information, and the POS device may transmit, to the electronic device 100, an NFC tag signal for requesting payment information (e.g., a token, a token cryptogram, or the like).

According to an embodiment, the electronic device 100 may transmits user identification information to the door device in response to the received NFC tag signal.

The door device may request authentication by transmitting the received user identification information to the server. The server may check whether the received user identification information matches user identification information pre-stored by being matched with the room in which the door device is installed.

In this case, the electronic device 100 may inform the user that an operation for locking or unlocking the door is being performed at present, by displaying an object 910 related to a key on the display 20.

Referring to reference number b9 of FIG. 9, the door device may unlock the door based on an authentication result received from the server.

For example, when an authentication result indicating that the received user identification information matches the user identification information pre-stored by being matched with the room in which the door device is installed is received from the door device, the door device may lock or unlock the door.

Otherwise, when an authentication result indicating that the received user identification information does not match the user identification information pre-stored by being matched with the room in which the door device is installed is received from the door device, the door device may not operate.

According to an embodiment, when the door device unlocks the door, the door device may transmit a door unlock state to the electronic device 100. The electronic device 100 which has received the door unlock state from the door device may change the object 910 related to a key to an object 920 for informing that the door is unlocked and display the object 920.

According to another embodiment, the electronic device 100 may receive door unlock information from the server, change the object 910 related to a key to the object 920 for informing that the door is unlocked, and display the object 920.

As described above, the electronic device 100 according to an embodiment may easily purchase a desired product or service by using preset user identification information and furthermore guide a user to easily lock or unlock a door based on the user identification information.

Figure 10:
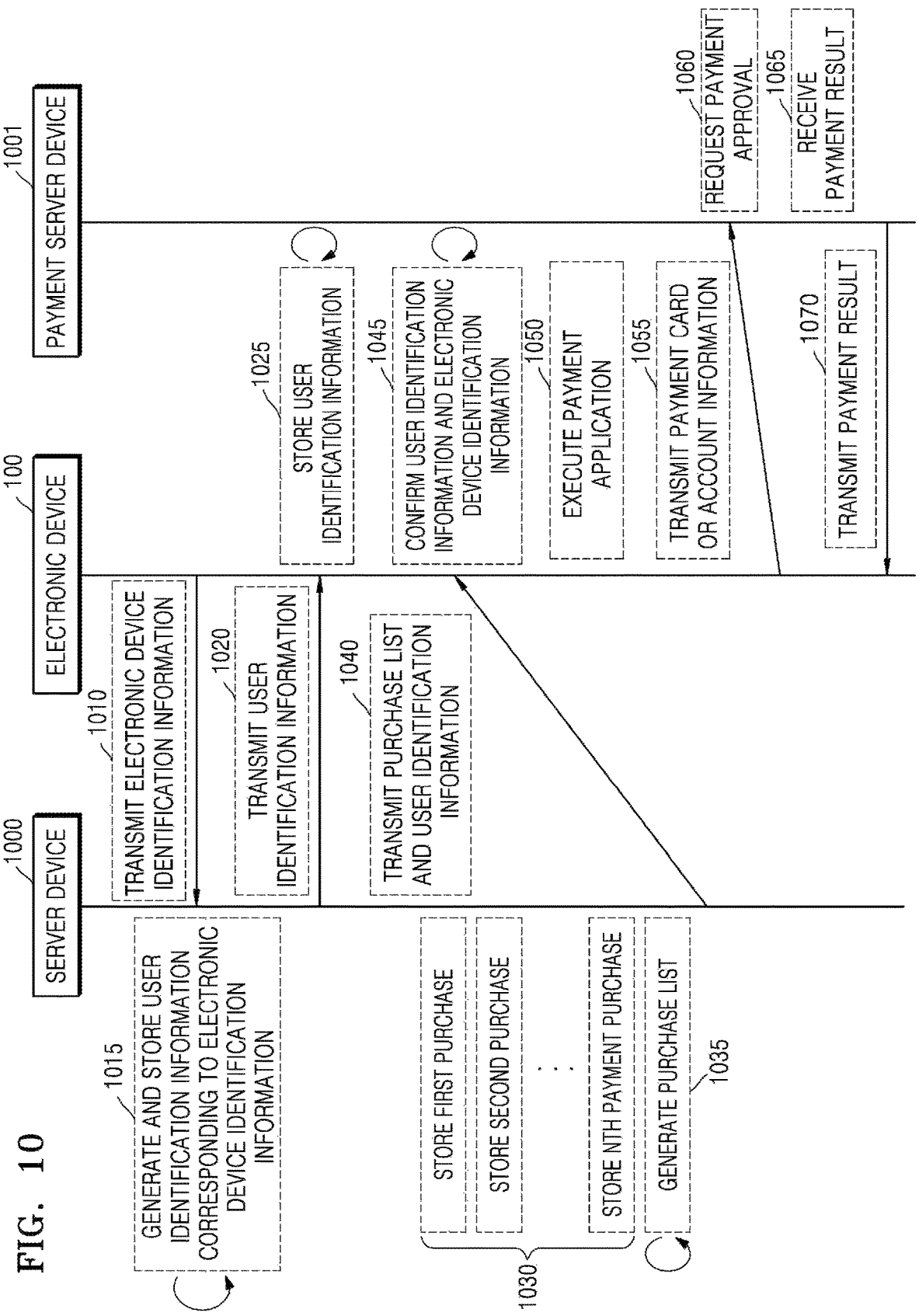
FIG. 10 is a data flow diagram of a situation in which an electronic device performs a lump sum payment for a purchase list, according to an embodiment.

FIG. 10 is a data flow diagram of a situation in which an electronic device performs a lump sum payment for a purchase list, according to an embodiment.

Referring to operation 1010, the electronic device 100 may transmit electronic device identification information to a server 1000. For example, when the server 1000 is a server in a hotel, the electronic device 100 may start information sharing by being electrically connected to an input and output device or the like electrically connected to the server 1000 in the hotel while checking in the hotel. The electronic device identification information may include, for example, a telephone number, an electronic device ID, or the like corresponding to the electronic device 100.

Referring to operation 1015, the server 1000 may generate user identification information corresponding to the electronic device identification information and store the user identification information by matching the user identification information with the electronic device identification information. The user identification information may correspond to, for example, a room number of the hotel which a user has reserved.

Referring to operation 1020, the server 1000 may transmit the generated user identification information to the electronic device 100.

Referring to operation 1025, the electronic device 100 may store the received user identification information. In this case, a payment application included in the electronic device 100 may also store the user identification information.

Referring to operation 1030, the server 1000 may store a current purchase breakdown occurring based on the user identification information.

Referring to operation 1035, the server 1000 may generate a purchase list including an entire current purchase breakdown when it is a preset time or according to the user's request.

Referring to operation 1040, the server 1000 may transmit the generated purchase list and the user identification information to the electronic device 100.

Referring to operation 1045, the electronic device 100 may confirm the user identification information and the purchase list transmitted from the server 1000. For example, the electronic device 100 may display, on a display, a user interface for requesting the user's confirmation. In addition, the electronic device 100 may transmit the confirmed purchase list to the server 1000 in response to a user input.

Referring to operation 1050, upon confirming the purchase list, the electronic device 100 may display a user interface for performing a payment for the purchase list by using an application by which a payment is possible.

Referring to operation 1055, the electronic device 100 may transmit payment card or account information to a payment server 1001. For example, the electronic device 100 may transmit payment information to a financial server by using an NFC module or an MST module.

Referring to operation 1060, the payment server 1001 may request authentication on the payment information from another financial server. Referring to operation 1065, the payment server 1001 may receive a payment result from another financial server. However, the present embodiment is not limited thereto. For example, the payment server 1001 may autonomously perform authentication on the payment information.

Referring to operation 1070, the payment server 1001 may transmit the payment result to the electronic device 100.

Figure 11:
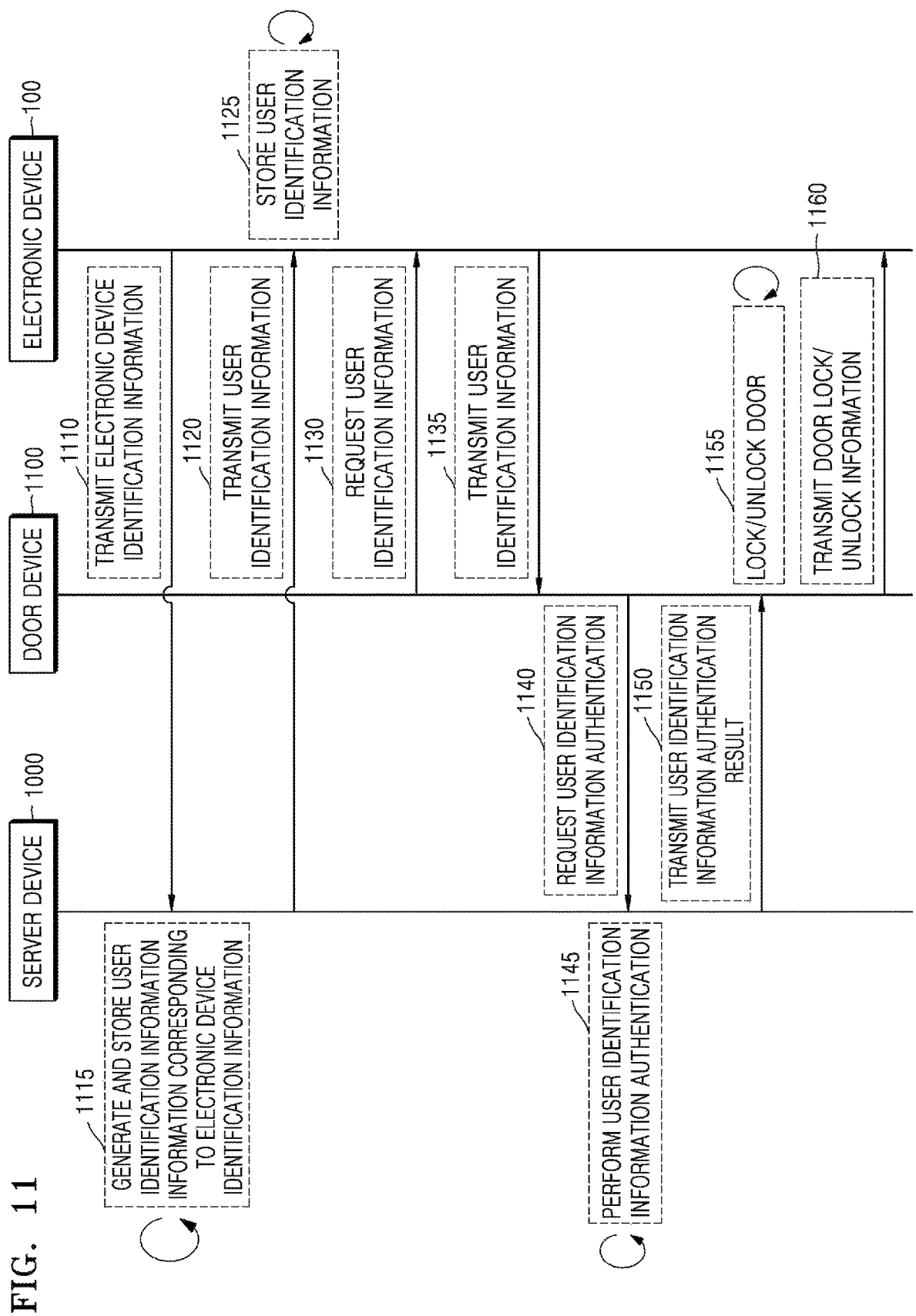
FIG. 11 is a data flow diagram of a situation in which an electronic device locks or unlocks a door by using user identification information, according to an embodiment.

FIG. 11 is a data flow diagram of a situation in which an electronic device locks or unlocks a door by using user identification information, according to an embodiment.

Referring to operation 1110, the electronic device 100 may transmit electronic device identification information to a server 1000 For example, when the server 1000 is a server in a hotel, the electronic device 100 may start information sharing by being electrically connected to an input and output device or the like electrically connected to the server 1000 in the hotel while checking in the hotel. The electronic device identification information may include, for example, a telephone number, an electronic device ID, or the like corresponding to the electronic device 100.

Referring to operation 1115, the server 1000 may generate user identification information corresponding to the electronic device identification information and store the user identification information by matching the user identification information with the electronic device identification information. The user identification information may correspond to, for example, a room number of the hotel which a user has reserved.

Referring to operation 1120, the server 1000 may transmit the generated user identification information to the electronic device 100.

Referring to operation 1125, the electronic device 100 may store the received user identification information. In this case, a payment application included in the electronic device 100 may also store the user identification information.

Referring to operation 1130, a door device 1100 may request the user identification information stored in the electronic device 100 when the electronic device 100 approaches or comes in contact with the door device 1100.

Referring to operation 1135, the electronic device 100 may transmit the user identification information to the door device 1100.

Referring to operation 1140, the door device 1100 may request authentication by transmitting the user identification information received from the electronic device 100 to the server 1000.

Referring to operation 1145, the server 1000 may check whether the user identification information received from the door device 1100 matches user identification information pre-stored by being matched with a room in which the door device 1100 is installed.

Referring to operation 1150, the server 1000 may transmit an authentication result of the user identification information to the door device 1100. However, the present embodiment is not limited thereto. For example, the server 1000 may transmit the authentication result of the user identification information to the door device 1100 and the electronic device 100.

Referring to operation 1155, the door device 1100 may lock or unlock a door when an authentication result indicating that the received user identification information matches the user identification information pre-stored by being matched with the room in which the door device 1100 is installed is received from the server 1000.

Otherwise, when an authentication result indicating that the received user identification information does not match the user identification information pre-stored by being matched with the room in which the door device 1100 is installed is received from the server 1000, the door device 1100 may not perform an operation of locking or unlocking the door.

Referring to operation 1160, the door device 1100 may transmit the authentication result of the user identification information to the electronic device 100. However, the present embodiment is not limited thereto. For example, the electronic device 100 may receive the authentication result of the user identification information from the server 1000.

Figure 12:
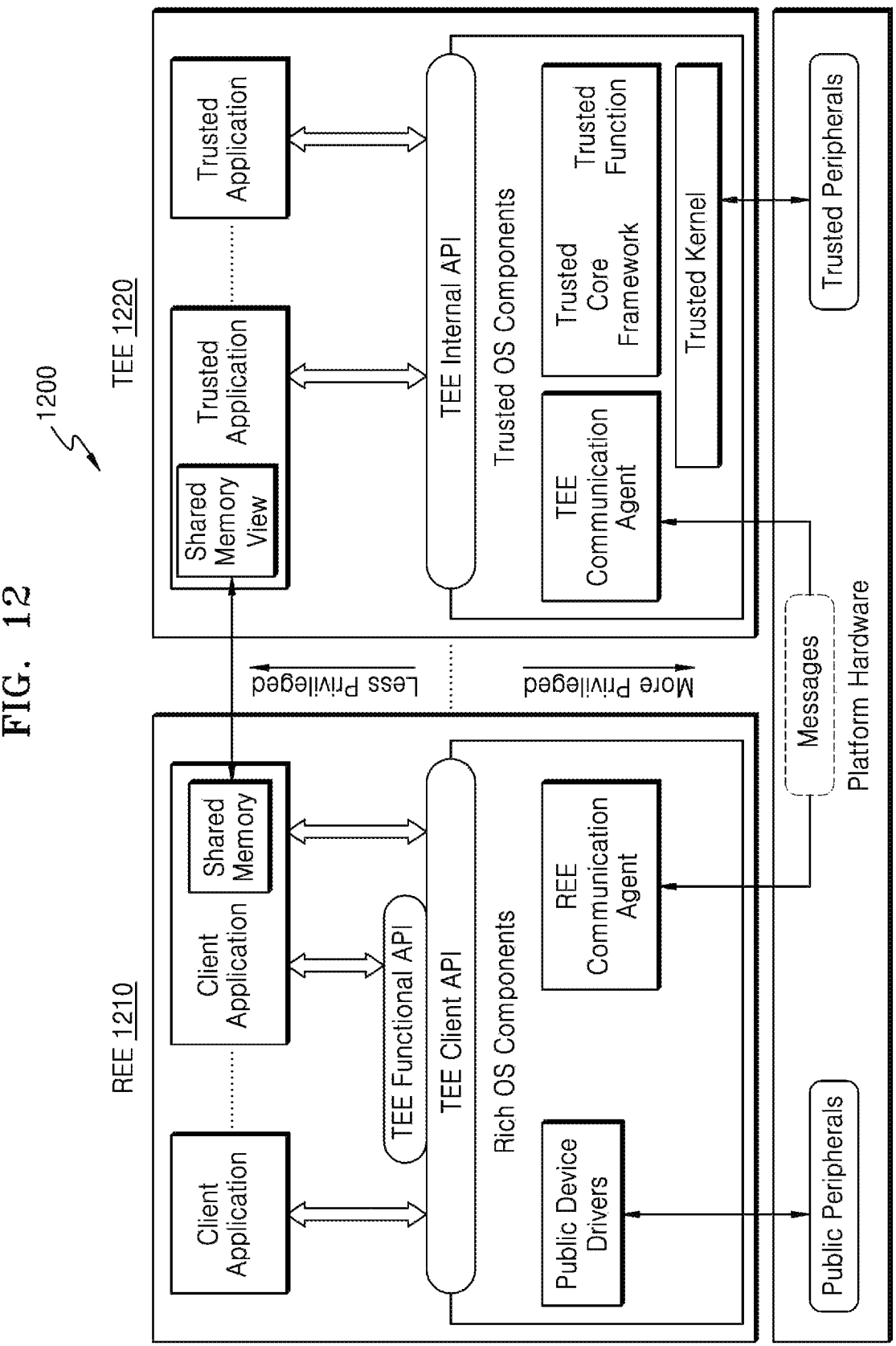
FIG. 12 is a block diagram of a rich execution environment (REE) and a trusted execution environment (TEE) operated by an electronic device, according to various embodiments.

FIG. 12 is a block diagram of a rich execution environment (REE) and a trusted execution environment (TEE) operated by an electronic device, according to various embodiments.

Referring to FIG. 12, an electronic device 1200 may operate a plurality of execution environments having security levels to reinforce security in a payment progress operation. The electronic device 1200 may include the electronic device 100 of FIG. 1. The plurality of execution environments may include, for example, an REE 1210 and a TEE 1220. The REE 1210 may be, for example, a first execution environment having a first security level. The TEE 1220 may be, for example, a second execution environment having a second security level other than (e.g., higher than) the first security level. According to an embodiment, the electronic device 1200 may include an additional other execution environment (e.g., a third execution environment) having a third security level but is not limited thereto.

The TEE 1220 may store, in a safe environment, data requiring a relatively high security level and perform a relevant operation. The TEE 1220 may operate on an application process of the electronic device 1200 and operate based on a reliable hardware structure determined in a manufacturing process of the electronic device 1200. The TEE 1220 may divide the application process or a memory into a general region and a security region and operate in the security region. The TEE 1220 may configure security-required software or hardware to operate only in the security region. The electronic device 1200 may operate the TEE 1220 through a physical modification of hardware or a logical modification of software.

The TEE 1220 may be separated from the REE 1210 through hardware restriction or operate by being separated from the REE 1210 in a software manner in the same hardware. At least one client application (e.g., a payment application, a contact application, an email, a browser, or the like) operating in the REE 1210 may use an application programming interface (API) (e.g., a TEE functional API or a TEE client API) allowed to access the TEE 1220. The least one client application may transmit messages from a communication agent of the REE 1210 (REE communication agent) to a communication agent of the TEE 1220 (TEE communication agent) by using the API. It may be implemented in a hardware manner that the messages are transmitted only to the TEE 1220. The REE 1210 may include an operating system (e.g., rich OS components) and operate drivers (public device drivers) for controlling public peripherals.

The communication agent of the TEE 1220 may receive the message and transmit the message to a security application related to the messages (trusted application (TA)) (e.g., digital rights management (DRM), a security payment module, a security biometric information module, or the like). The TA may perform an operation related to the message and transmits a result of the operation to the communication agent of the REE 1210 through the communication agent of the TEE 1220. The communication agent of the REE 1210 may transmit the result to at least one application running in the REE 1210. The TEE 1220 may include a security OS (trusted OS components) configured to operate the TA based on an internal API (TEE internal API). The trusted OS components may include a trusted kernel for controlling trusted peripherals, a trusted core framework, a trusted function, and the like.

Figure 13:
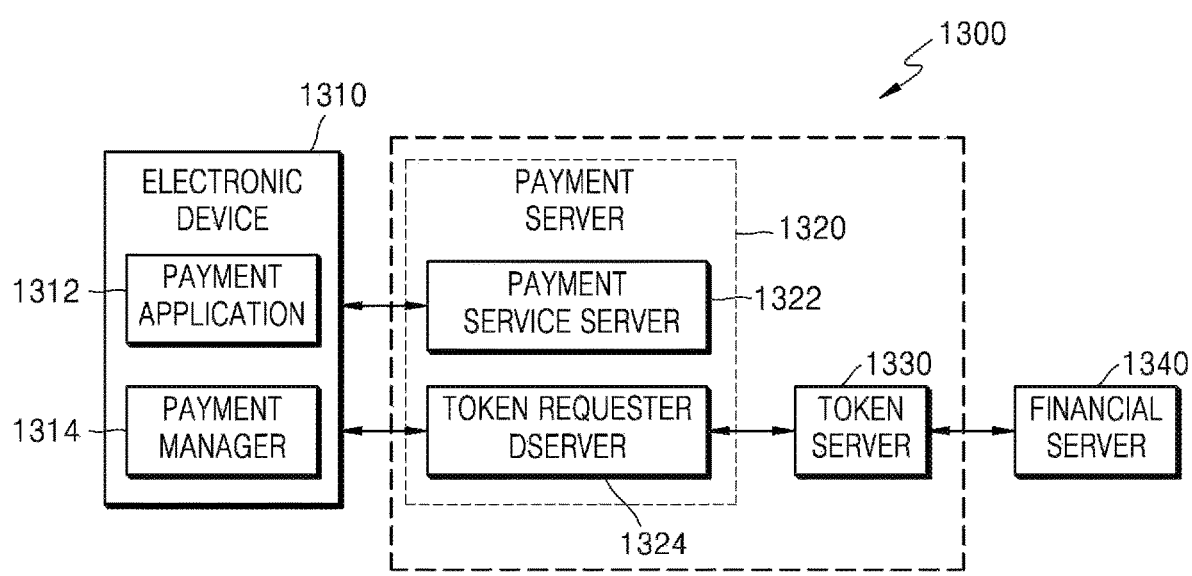
FIG. 13 is a block diagram of a payment system according to various embodiments.

FIG. 13 is a block diagram of a payment system 1300 according to various embodiments.

Referring to FIG. 13, the payment system 1300 may include an electronic device 1310 and/or a server. For example, the server may include a payment server 1320, a token server (token service provider) 1330, or a financial server (issuer) 1340. The electronic device 1310 may include, for example, a payment application (wallet application) 1312 and/or a payment manager 1314. The payment server 1320 may include, for example, a payment service server 1322 and/or a token requester server (token requester) 1324.

According to various embodiments, the payment application 1312 may include, for example, a Samsung Pay™ application. The payment application 1312 may provide, for example, a payment-related user interface (e.g., UI or UX). The payment-related user interface may include a wallet UI/UX. For example, the payment application 1312 may provide a UI related to a transaction card registration, payment, or transaction. The payment application 1312 may provide, for example, an interface related to card registration through a character reader (e.g., optical character reader/recognition (OCR) or an external input (e.g., user input). In addition, the payment application 1312 may provide, for example, an interface related to user authentication through identification and verification (ID&V).

According to various embodiments, the payment application 1312 may perform a payment transaction. For example, the payment application 1312 may provide a payment function to a user through execution of Simple Pay, Quick Pay, or a designated application. In the present document, Quick Pay may be mixedly used with Simple Pay and may be analyzed in the same meaning as Simple Pay. The user may perform the payment function by using the payment application 1312 and receive information related to the payment function.

According to various embodiments, the payment manager 1314 may include information related to a card company. For example, the payment manager 1314 may include a card company software development kit (SDK).

According to various embodiments, the payment server 1320 may include a management server for an electronic payment or a mobile payment. The payment server 1320 may, for example, receive information related to a payment from the electronic device 1310 and transmit the received information to the outside or process the received information therein.

According to various embodiments, the payment server 1320 may transmit and receive information between the electronic device 1310 and the token server 1330 by using the payment service server 1322 and/or the token requester server 1324. The payment service server 1322 may manage, for example, card information linked to a service account (e.g., Samsung account) or a user account. In addition, the payment service server 1322 may include an API related to the payment application 1312. In addition, the payment service server 1322 may provide, for example, an account management module (e.g., account integration or Samsung account integration).

According to various embodiments, the token requester server 1324 may provide an interface for processing information related to a payment. For example, the token requester server 1324 may issue, delete, or activate payment-related information (e.g., token). Alternatively, the token requester server 1324 may control payment-related information by being functionally connected to the payment manager 1314.

According to various embodiments, the payment application 1312 included in the electronic device 1310 may be connected functionally or based on a communication channel to the payment service server 1322 included in the payment server 1320. For example, the payment application 1312 may transmit and receive payment-related information to and from the payment server 1320. According to an embodiment, the payment manager 1314 included in the electronic device 1310 may be functionally connected to the token requester server 1324 included in the payment server 1320. For example, the payment manager 1314 may transmit and receive payment-related information to and from the token requester server 1324.

According to various embodiments, the token server 1330 may issue or manage payment-related information (e.g., token). For example, the token server 1330 may control a life cycle of a token. The life cycle may include a generation, correction, or deletion cycle. In addition, the token server 1330 may include, for example, a token management server and perform token provisioning, ID&V, replenishment, or life cycle management. In addition, the token server 1330 may perform integration of information related to the financial server 1340.

According to various embodiments, the payment server 1320 and/or the token server 1330 may be located in a same region or similar regions or respectively located in regions separated from each other. For example, the payment server 1320 may be included in a first server, and the token server 1330 may be included in a second server. In addition, for example, the payment server 1320 and/or the token server 1330 may be implemented by being separately located in one server (e.g., a first server or a second server).

According to various embodiments, the financial server 1340 may issue a card. For example, the financial server 1340 may include a card issuance bank. In addition, the financial server 1340 may generate payment-required information to be provided to the user. The user may store, in the electronic device 1310, the payment-required information generated by the financial server 1340, by using the payment application 1312. In addition, the financial server 1340 may be functionally connected to the token server 1330 to transmit and receive the payment-required information.

Figure 14:
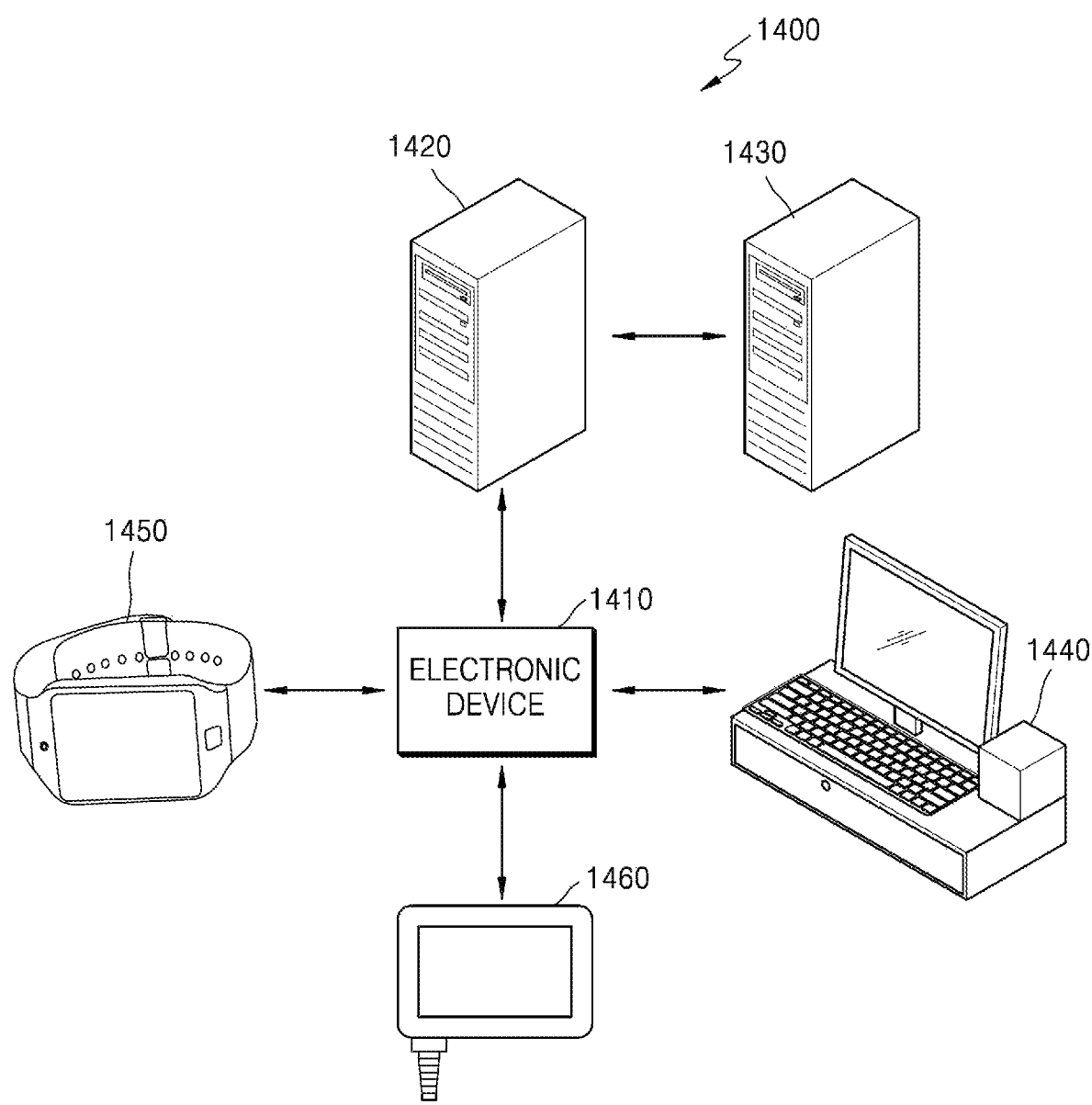
FIG. 14 is a block diagram of a payment system for performing a payment, according to various embodiments.

FIG. 14 is a block diagram of a payment system 1400 for performing a payment, according to various embodiments.

Referring to FIG. 14, the payment system 1400 may include an electronic device 1410, a payment server 1420, a token service provider (TSP) 1430 (e.g., the token server 1330), and a POS 1440. The electronic device 1410 may include the electronic device 100 of FIG. 1 and the electronic device 1310 of FIG. 13.

According to an embodiment, the payment system 1400 may include one or more additional electronic devices 1450 or 1460. The one or more additional electronic devices may include a wearable device 1450 (e.g., a smart watch) functionally (e.g., communication) connectible to the electronic device 1410 or an accessory 1460 (e.g., a fob-shaped device of LoopPay™, a universal serial bus (USB)-shaped accessory, a cover-shaped accessory, or a card-shaped accessory). According to an embodiment, the fob-shaped device of LoopPay™ may include an external payment module connected to the electronic device 1410 through a microphone.

According to an embodiment, the electronic device 1410 may perform a payment function. The electronic device 1410 may register a card (e.g., a credit card such as Mastercard or VISA) in the electronic device 1410 or the payment server 1420 to perform the payment function The payment server 1420 may manage information a plurality of registered cards including a card registered through the user's other electronic device (e.g., the electronic device 1450 or 1460) corresponding to the electronic device 1410 or a card registered through an electronic device of another user, in addition to the card registered through the electronic device 1410.

According to an embodiment, the payment server 1420 may acquire token information corresponding to registered card information from the TSP 1430 and transmit the acquired token information to the electronic device 1410. The payment server 1420 may include, for example, a payment service server (e.g., the payment service server 1322 of FIG. 13) or a token requester server (e.g., the token requester server 1324 of FIG. 13). The payment service server (e.g., the payment service server 1322 of FIG. 13) may manage card information of the user. The payment service server (e.g., the payment service server 1322 of FIG. 13) may provide a payment-related service based on an account. The token requester server (e.g., the token requester server 1324 of FIG. 13) may acquire token information required for a payment operation by requesting the token information from the TSP 1430.

The TSP 1430 may issue a token to be used in a payment process. According to an embodiment, the token may be a value which replaces a primary account number (PAN) that is information about a card. According to an embodiment, the token may be generated by using a bank identification number (BIN) or the like. In addition, the generated token may be encrypted by the TSP 1430, or transmitted to the payment server 1420 in a non-encrypted state and then encrypted by the payment server 1420. The encrypted token information may be transmitted to the electronic device 1410 through the payment server 1420 and then decrypted by the electronic device 1410.

According to an embodiment, the token may be generated and encrypted by the TSP 1430 and transmitted to the electronic device 1410 without passing through the payment server 1420. According to another embodiment, the payment server 1420 may include a token generation function, and in this case, the payment system 1400 may not separately include the TSP 1430.

The electronic device 1410 may perform a payment by using at least one of one or more other electronic devices 1450 or 1460 functionally connected thereto based on short-range communication (e.g., Bluetooth or Wi-Fi). According to an embodiment, the other electronic device 1450 may be a wearable device (e.g., a smart watch), and in this case, the electronic device 1410 may transmit the token received from the TSP 1430 to the wearable device. According to an embodiment, the other electronic device 1460 may be an accessory (e.g., a fob-shaped device of LoopPay™), in this case, the electronic device 1410 may be functionally connected to the accessory (e.g., a fob-shaped device of Loop-Pay™) through an input and output interface.

Figure 15:
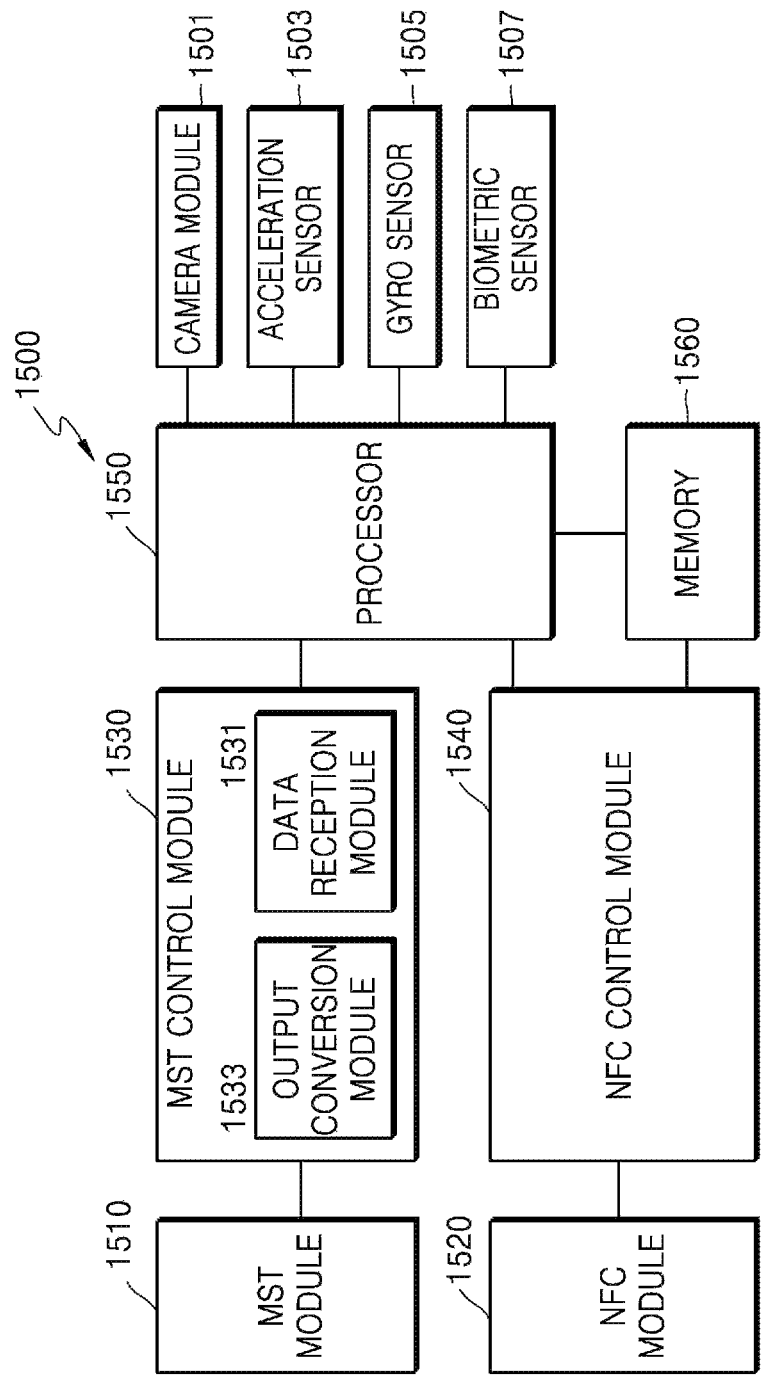
FIG. 15 is a block diagram of a hardware structure of an electronic device capable of performing a payment function, according to various embodiments.

FIG. 15 is a block diagram of a hardware structure of an electronic device 1500 capable of performing a payment function, according to various embodiments.

According to an embodiment, the electronic device 1500 may include, for example, a camera module 1501, an acceleration sensor 1503, a gyro sensor 1505, a biometric sensor 1507, an MST module 1510, an NFC module 1520, an MST control module 1530, an NFC control module 1540, a processor 1550, and a memory 1560. The electronic device 1500 may include the electronic device 100 of FIG. 1, the electronic device 1310 of FIG. 13, and the electronic device 1410 of FIG. 14. The processor 1550 may include the processor 240 of FIG. 2. The memory 1560 may include the memory 230 of FIG. 2.

The camera module 1501 may acquire card information by photographing a card required for a payment. The camera module 1501 may recognize card information (e.g., card company, card number, card expiry date, card owner, or the like) mentioned on the card through an OCR function. Alternatively, a user may input necessary card information into the electronic device 1500 by using an input device (e.g., a touch panel, a pen sensor, a key, an ultrasonic input device, a microphone input device, or the like) included in the electronic device 1500.

According to an embodiment, the acceleration sensor 1503 or the gyro sensor 1505 may acquire a position state of the electronic device 1500 when a payment is performed. The acquired position information of the electronic device 1500 may be transmitted to the processor 1550, and the processor 1550 may adjust a strength of a magnetic field to be output to a POS from the MST module 1510, based on the acquired position state of the electronic device 1500. When a plurality of coil antennas are available, the processor 1550 may select a coil antenna to be used. According to an embodiment, the MST control module 1530 may include a data reception module 1531 and an output conversion module 1533. The data reception module 1531 may receive a pulse signal in a logical low/high form including payment information transmitted from the processor 1550 or a security module (e.g., electronic security equipment (eSE)).

The output conversion module 1533 may include a circuit configured to convert data recognized by the data reception module 1531 into a necessary form in order to transmit the converted data to the MST module 1510. The circuit may include H-Bridge configured to control a direction of a voltage to be supplied to both ends of the MST module 1510. H-Bridge may include a circuit structure connected in an H shape by using four switch structures.

According to an embodiment, based on card information input through the camera module 1501 or the input device (e.g., a touch panel, a pen sensor, or the like), the electronic device 1500 may receive payment information (e.g., track 1/2/3 or token information), included in a magnetic stripe, from a card company/bank server through a communication module (not shown). The electronic device 1500 may store the received payment information in the memory 1560 or a separate security module (e.g., eSE) in a necessary form.

The disclosed embodiments may be implemented by a software (S/W) program including instructions stored in a computer-readable storage media.

A computer is a device capable of calling the stored instruction from the storage media and performing an operation according to the disclosed embodiment in response to the called instructions and may include the electronic devices according to the disclosed embodiments.

The computer-readable storage media may be provided in a form of non-transitory media. Herein, 'non-transitory' only indicates that a storage medium does not include a signal and is tangible, and does not care about whether data is semi-permanently or temporarily stored in the storage medium.

In addition, a control method according to the disclosed embodiments may be provided by being included in a computer program product. The computer program product may be traded between a seller and a purchaser as a product.

The computer program product may include an S/W program or a computer-readable storage medium in which the S/W program is stored. For example, the computer program product may include a S/W program-type product (e.g., a downloadable application) electronically distributed through an electronic device manufacturer or an electronic market (e.g., Google PlayStore or AppStore). For the electronic distribution, at least a portion of the S/W program may be stored in a storage medium or may be temporarily generated. In this case, the storage medium may be a storage medium of a server of the manufacturer, a server of the electronic market, or a relay server temporarily storing the S/W program.

The computer program product may include a storage medium of a server or a storage medium of an electronic device in a system including the server and the electronic device. Alternatively, when a third device (e.g., a smartphone) is connected to the server or the electronic device, the computer program product may include a storage medium of the third device. Alternatively, the computer program product may include a S/W program transmitted from the server to the electronic device or the third device or transmitted from the third device to the electronic device.

In this case, one of the server, the electronic device, and the third device may perform the methods according to the disclosed embodiments by executing the computer program product. Alternatively, two or more of the server, the electronic device, and the third device may perform the methods according to the disclosed embodiments in a distributed manner by executing the computer program product.

For example, the server (e.g., a cloud server, an artificial intelligence server, or the like) may execute the computer program product stored in the server to control the electronic device connected to the server through communication such that the electronic device performs the methods according to the disclosed embodiments.

As another example, the third device may execute the computer program product to control the electronic device connected to the third device through communication such that the electronic device performs the methods according to the disclosed embodiments. In detail, the third device may remotely control the electronic device to transmit electronic device identification information to the server, stores user identification information received from the server, and displays, on a display, a purchase list received from the server.

When the third device executes the computer program product, the third device may download the computer program product from the server and execute the downloaded computer program product. Alternatively, the third device may perform the methods according to the disclosed embodiments by executing the computer program product provided in a pre-loaded state.

What is claimed is:

1. An electronic device comprising:
    a display;
    a communication module;
    a processor; and
    a memory storing instructions and electrically connected to the processor,
    wherein the processor is configured to execute the instructions stored in the memory to control the electronic device to perform operations comprising:
        transmitting, using the communication module, electronic device identification information of the electronic device to an external server associated with an establishment,
        receiving, from the external server, using the communication module, user identification information generated by the external server based on the electronic device identification information,
    wherein the instructions comprise further instructions to control the electronic device to perform purchase operations at the establishment using the user identification information, the purchase operations comprising:
        displaying, on the display, a Graphical User Interface (GUI) for setting at least one purchase restriction regarding a payment for a plurality of purchases at the establishment generated in correspondence with the user identification information,
        setting the at least one purchase restriction based on a user input to the GUI,
        obtaining a request for the payment of the plurality of purchases generated in correspondence with the user identification information,
        in response to obtaining the request for the payment, determining whether the request for the payment is related to the at least one purchase restriction,
        based on determining that the request for the payment is related to the at least one purchase restriction, displaying, on the display, a purchase list including the plurality of purchases generated in correspondence with the user identification information, and
        displaying, on the display, a user interface for payment of the purchases included in the purchase list, based on input to the electronic device,
    wherein the instructions comprise further instructions to control the electronic device to unlock a locked door of a room at the establishment using the user identification information, the locking/unlocking operations comprising:
    receiving a request for user identification information from a door device for controlling the unlocking of the locked door;
    transmitting the user identification information to control the door device, wherein the door device unlocks the locked door based on determining a correspondence between the transmitted user identification information and the user identification information generated by the external server based on the electronic device identification information;
    receiving state information from the door device relating to the unlocked door; and
    displaying, on the display, indicia based on the state information.

2. The electronic device of claim 1, wherein the processor is further configured to execute the instructions to store the user identification information when the processor receives the user identification information generated by the external server in response to the identification information of the electronic device.

3. The electronic device of claim 2, wherein the processor is further configured to execute the instructions to control the display to display the purchase list when the purchase list is received from the external server.

4. The electronic device of claim 3, wherein the user interface for payment permits payment for the purchases in the purchase list using a payment card or a payment account.

5. The electronic device of claim 2, wherein the user interface permits selection of at least one of a plurality of different payment cards or at least one of a plurality of different payment accounts for paying for the purchases included in the purchase list, based on input to the electronic device.

6. The electronic device of claim 1, wherein the communication module comprises a first communication module and a second communication module, and the processor is further configured to execute the instructions to control to transmit payment information for the purchases included in the purchase list to an external device using any one of the first communication module and the second communication module according to input to the electronic device.

7. The electronic device of claim 6, wherein the first communication module comprises a short-range communication module, and the second communication module comprises a magnetic security transmission module.

8. A method of controlling an electronic device, the method comprising:
  transmitting electronic device identification information of the electronic device to an external server associated with an establishment;
  receiving and storing user identification information generated by the external server based on the electronic device identification information,
  wherein the method further comprises purchase operations at the establishment using the user identification information, the purchase operations comprising:
  displaying, on a display of the electronic device, a Graphical User Interface (GUI) for setting at least one purchase restriction regarding a payment for a plurality of purchases at the establishment generated in correspondence with the user identification information;
  setting the at least one purchase restriction based on a user input to the GUI;
  obtaining a request for the payment of the plurality of purchases generated in correspondence with the user identification information;
  in response to obtaining the request for the payment, determining whether the request for the payment is related to the at least one purchase restriction;
  based on determining that the request for the payment is related to the at least one purchase restriction, receiving a purchase list generated based on the user identification information and displaying the purchase list on the display; and
  displaying, on the display, a user interface for payment of the purchases included in the purchase list, based on input to the electronic device,
  wherein the method further comprises locking/unlocking to unlock a locked door of a room at the establishment using the user identification information, the locking/unlocking operations comprising:
  receiving a request for user identification information from a door device for controlling the unlocking of the locked;
  transmitting the user identification information to control the door device, wherein the door device unlocks the locked door based on determining a correspondence between the transmitted user identification information and the user identification information generated by the external server based on the electronic device identification information;
  receiving state information from the door device relating the unlocked door; and
  displaying to display indicia based on the lock/unlock state information.

9. The method of claim 8, wherein
  the user identification information is stored in the electronic device by a payment application executed in the electronic device.

10. The method of claim 9, wherein
  the purchase list is displayed on the display by the payment application executed in the electronic device.

11. The method of claim 10, wherein the user interface for payment permits payment for the purchases in the purchase list using a payment card or a payment account.

12. The method of claim 9, wherein the user interface permits selection of at least one of a plurality of different payment cards or at least one of a plurality of different payment accounts for paying for the purchases included in the purchase list.

13. A computer program product comprising a non-transitory computer-readable recording medium comprising instructions which, when executed, cause a processor of an electronic device to control the electronic device to:
  transmit electronic device identification information of the electronic device to an external server associated with an establishment;
  receive and store user identification information generated by the server based on the electronic device identification information,
  wherein the instructions comprise further instructions to cause the processor of the electronic device control the electronic device to perform purchase operations at the establishment using the user identification information, the purchase operations comprising:
  displaying, on a display of the electronic device, a Graphical User Interface (GUI) for setting at least one purchase restriction regarding a payment for a plurality of purchases at the establishment generated in correspondence with the user identification information;
  setting the at least one purchase restriction based on a user input to the GUI;
  obtaining a request for the payment of the plurality of purchases generated in correspondence with the user identification information;
  in response to obtaining the request for the payment, determining whether the request for the payment is related to the at least one purchase restriction;
  based on determining that the request for the payment is related to the at least one purchase restriction, receiving a purchase list generated based on the user identification information and display the purchase list on the display; and
  displaying, on the display, a user interface for payment for the purchases included in the purchase list, based on input to the electronic device,
  wherein the instructions comprise further instructions to cause the processor to control the electronic device to unlock a locked door of a room at the establishment using the user identification information, the locking/unlocking operations comprising:
  receiving a request for user identification information from a door device for controlling the unlocking of the locked door;
  transmitting the user identification information to control the door device, wherein the door device unlocks the locked door based on determining a correspondence between the transmitted user identification information and the user identification information generated by the external server based on the electronic device identification information;
  receiving state information from the door device relating to the unlocked door; and
  displaying to display indicia based on the lock/unlock state information.

* * * * *